(12) United States Patent
Motohashi et al.

(10) Patent No.: US 7,836,536 B2
(45) Date of Patent: Nov. 23, 2010

(54) VEHICLE FOR PASSENGER ENTRY AND EXIT

(75) Inventors: Kenichi Motohashi, Tokyo (JP); Akihiko Fujimoto, Tokyo (JP); Koji Ichinose, Tokyo (JP); Toru Kikuchi, Tokyo (JP); Koichi Takemoto, Tokyo (JP)

(73) Assignee: TCM Corporation, Tokyo (JP)

( * ) Notice: Subject to any disclaimer, the term of this patent is extended or adjusted under 35 U.S.C. 154(b) by 228 days.

(21) Appl. No.: 12/223,745

(22) PCT Filed: Jan. 31, 2007

(86) PCT No.: PCT/JP2007/051574
§ 371 (c)(1),
(2), (4) Date: Oct. 6, 2008

(87) PCT Pub. No.: WO2007/091461
PCT Pub. Date: Aug. 16, 2007

(65) Prior Publication Data
US 2009/0223005 A1   Sep. 10, 2009

(30) Foreign Application Priority Data
Feb. 7, 2006   (JP) .............................. 2006-029086

(51) Int. Cl.
*E01D 1/00* (2006.01)
(52) U.S. Cl. .................. 14/71.5; 14/71.3; 414/921; 280/6.152
(58) Field of Classification Search .............. 280/1, 280/5.3, 6.152; 14/71.3, 71.5; 414/921
See application file for complete search history.

(56) References Cited

U.S. PATENT DOCUMENTS

| | | | | |
|---|---|---|---|---|
| 2,778,674 A | * | 1/1957 | Attendu | 296/179 |
| 2,929,655 A | * | 3/1960 | Hurter | 296/179 |
| 3,419,164 A | * | 12/1968 | O'Neill | 414/345 |
| 3,524,563 A | | 8/1970 | McCartney, et al. | |
| 3,537,723 A | * | 11/1970 | Herring, Jr. | 280/6.152 |
| 3,537,745 A | * | 11/1970 | Herring, Jr. | 296/179 |
| 3,650,558 A | * | 3/1972 | Eggert, Jr. | 296/179 |
| 3,664,456 A | | 5/1972 | Smith, Sr. et al. | |

(Continued)

FOREIGN PATENT DOCUMENTS

CA            942010         2/1974

(Continued)

*Primary Examiner*—Gary S Hartmann
(74) *Attorney, Agent, or Firm*—D. Peter Hochberg; Sean F. Mellino; Daniel J. Smola

(57) ABSTRACT

A floor section is formed at the rear of a vehicle body, at one side of the vehicle body. A lifting floor device having a floor body lifted and lowered by a lifting drive device is placed above the vehicle body. The floor body has a cutout at the left side of the floor body, at the rear half thereof. The right side of the floor body is used as a passage for a physically handicapped person. A stairway device is provided between the floor body and the floor section as a passage for an able-bodied person, on the floor body side in the cutout, and the stairway device is pivotable in a vertical plane. A lifting table is placed behind the vehicle body, on the left side thereof so that the lifting table can face the rear end of the passage for a physically handicapped person.

6 Claims, 26 Drawing Sheets

U.S. PATENT DOCUMENTS

| | | | | |
|---|---|---|---|---|
| 3,910,264 A | * | 10/1975 | Mahieu | 182/69.4 |
| 4,690,606 A | * | 9/1987 | Ross | 414/495 |
| 4,971,510 A | * | 11/1990 | Houle | 414/546 |
| 5,040,257 A | * | 8/1991 | Bentz | 14/70 |
| 5,154,569 A | * | 10/1992 | Eryou et al. | 414/495 |
| 5,595,470 A | * | 1/1997 | Berkey et al. | 414/495 |
| 6,802,391 B2 | * | 10/2004 | Ganiere | 182/69.6 |

FOREIGN PATENT DOCUMENTS

| | | |
|---|---|---|
| GB | 1360831 | 7/1974 |
| JP | 52-135199 | 11/1977 |
| JP | 57-044520 | 9/1982 |
| JP | 09-194198 | 7/1997 |
| JP | 2002-167054 | 6/2002 |
| JP | 2004-099020 | 4/2004 |
| JP | 3619519 | 2/2005 |
| JP | 2005-349993 | 12/2005 |
| JP | 2007-030677 | 2/2007 |

\* cited by examiner

VEHICLE FOR PASSENGER ENTRY AND EXIT

CROSS-REFERENCE TO RELATED APPLICATIONS

This application is a National Stage application of International Application No. PCT/JP2007/051574, filed on Jan. 31, 2007, which claims priority of Japanese application number 2006-029086, filed on Feb. 7, 2006, both of which are incorporated herein by reference in their entireties.

BACKGROUND OF THE INVENTION

1. Technical Field

The present invention relates to a vehicle for passenger entry and exit which allows both an able-bodied person and a physically handicapped person to enter and exit a passenger airplane.

2. Background Art

As described below, a vehicle for passenger entry and exit has been proposed which allows both an able-bodied person and a physically handicapped person to enter and exit a passenger airplane (hereinafter referred to as an airplane).

The vehicle for passenger entry and exit comprises a horizontal floor provided at a position corresponding to a passenger platform and at a predetermined height position so as to form a transfer floor surface for passengers, a stairway device having an upper end attached to the horizontal floor, and a hydraulic cylinder that causes the stairway device to pivot around the upper end thereof in a vertical plane. Furthermore, the stairway device has a plurality of stair treads and a placement plate provided at a lower end thereof and wide enough to place a wheelchair or the like thereon. Moreover, the plurality of stair treads and the placement plate are provided in the stairway device via a parallel link mechanism so as to each take a horizontal posture regardless of the inclination of the stairway device (see, for example, Japanese Patent Laid-Open No. 9-194198).

With this configuration, the hydraulic cylinder performs a contracting operation to extend the stairway device from the horizontal floor side to the ground, so that an able-bodied person can walk along the placement plate, the stairway device, and the horizontal floor in this order to enter the airplane and conversely exit the airplane.

Furthermore, for a physically handicapped person in a wheelchair, the wheelchair is moved onto the placement plate, and then the hydraulic cylinder performs an expanding operation to cause the stairway device to pivot upward so that the stairway device takes a horizontal posture. Thus, the stair treads and the placement plate are placed at the same level as the horizontal floor.

Then, in this condition, the wheelchair is moved along the placement plate, the group of stair treads, and the horizontal floor in this order to allow the physically handicapped to enter the airplane. Of course, the physically handicapped person is allowed to exit the airplane by causing the stairway device to pivot downward from the horizontal posture with the wheelchair placed on the placement plate.

SUMMARY OF THE PRESENT INVENTION

However, in the vehicle for passenger entry and exit, the horizontal floor is always set at the predetermined height. Thus, for example, a vehicle for passenger entry and exit for medium-sized airplanes cannot be used for entry to and exit from small-sized airplanes. Consequently, a stairway device dedicated to small-sized airplanes needs to be prepared for entry to and exit from the small-sized airplanes. That is, two types of lifting devices need to be prepared. Furthermore, while a physically handicapped person in a wheelchair is using a vehicle, an able-bodied person cannot use the vehicle. That is, the physically handicapped person and the able-bodied person cannot simultaneously enter or exit the airplane.

Thus, an object of the present invention is to provide a vehicle for passenger entry and exit which allows passengers to enter and exit an airplane regardless of the size of the airplane and which allows a physically handicapped person and an able-bodied person to simultaneously enter and exit the airplane.

To accomplish this object, a vehicle for passenger entry and exit according to the present invention includes: a vehicle body, the vehicle body having a floor section formed at a rear of the vehicle body, at one side thereof; a lifting floor device placed above the vehicle body and having a floor body lifted and lowered by a lifting drive device, the floor body having a cutout at one side of the floor body, at a rear half thereof, and the other side of the floor body being used as a passage for a physically handicapped person; a stairway device as a passage for an able-bodied person being provided between the floor body and the floor section on the floor body side in the cutout, the stairway device being pivotable in a vertical plane; and a lifting table device having a lifting table placed behind the vehicle body on the other side thereof, the lifting table being adapted so that, when lifted, the lifting table can face the rear end of the passage for a physically handicapped person.

Furthermore, in another, first aspect of the vehicle for passenger entry and exit according to the present invention, a stairway section is provided behind the floor section of the vehicle body of the vehicle for passenger entry and exit.

Furthermore, in another, second aspect of the vehicle for passenger entry and exit according to the present invention, the stairway device of the vehicle for passenger entry and exit has a stairway body having a plurality of stair treads, a movable member that can be placed upright and over sideways is provided on a side of the stairway body, and the movable member is adapted so that when the floor body is lowered to place the stairway body horizontally to cause the movable member to take a lying sideways posture, a passage for an able-bodied person is formed on a top surface of the movable member and so that when the floor body is lifted to place the stair treads horizontally to tilt the stairway body to cause the movable member to take an upright posture, the movable member forms a side cover.

Furthermore, in another, third aspect of the vehicle for passenger entry and exit according to the present invention, the stairway device of the vehicle for passenger entry and exit includes a lateral pair of side plates each having a front end pivotably attached to the floor body via a horizontal shaft, a plurality of stair treads supported between the opposite side plates so as to be pivotable in a vertical plane, and a link member pivotably coupled to a position of each of the stair treads which is different from that at which the stair tread is supported, the link member forming a parallel link mechanism together with the side plates and the stair treads.

Furthermore, in another, fourth aspect of the vehicle for passenger entry and exit according to the present invention, the lifting table device of the vehicle for passenger entry and exit includes a lifting table provided at the rear end of the vehicle body so as to be able to be lifted and lowered, and a lifting drive section that lifts and lowers the lifting table, and a side wall member is provided at a side of the lifting table, and openable and closable doors are provided at the front and the rear of the lifting table.

Moreover, in another, fifth aspect of the vehicle for passenger entry and exit according to the present invention, the floor body of the vehicle for passenger entry and exit includes a lifting floor supported on the lifting drive device side, a moving floor provided at the front of the lifting floor so as to be controllably extended from and retracted to the front end of the lifting floor, and an extending and retracting device that extends and retracts the moving floor from and to the lifting floor.

Thus, the stairway device constituting the passage for an able-bodied person is placed at one side of the floor body that can be lifted and lowered by the lifting drive device depending on the size of the fuselage of an airplane. The passage for a physically handicapped person is provided at the other side of the floor body opposite the lifting table of the lifting table device. Consequently, the single vehicle for passenger entry and exit allows an able-bodied person and a physically handicapped person to simultaneously enter and exit an airplane regardless of the size of the fuselage.

DETAILED DESCRIPTION OF THE PRESENT INVENTION

Figure 1:
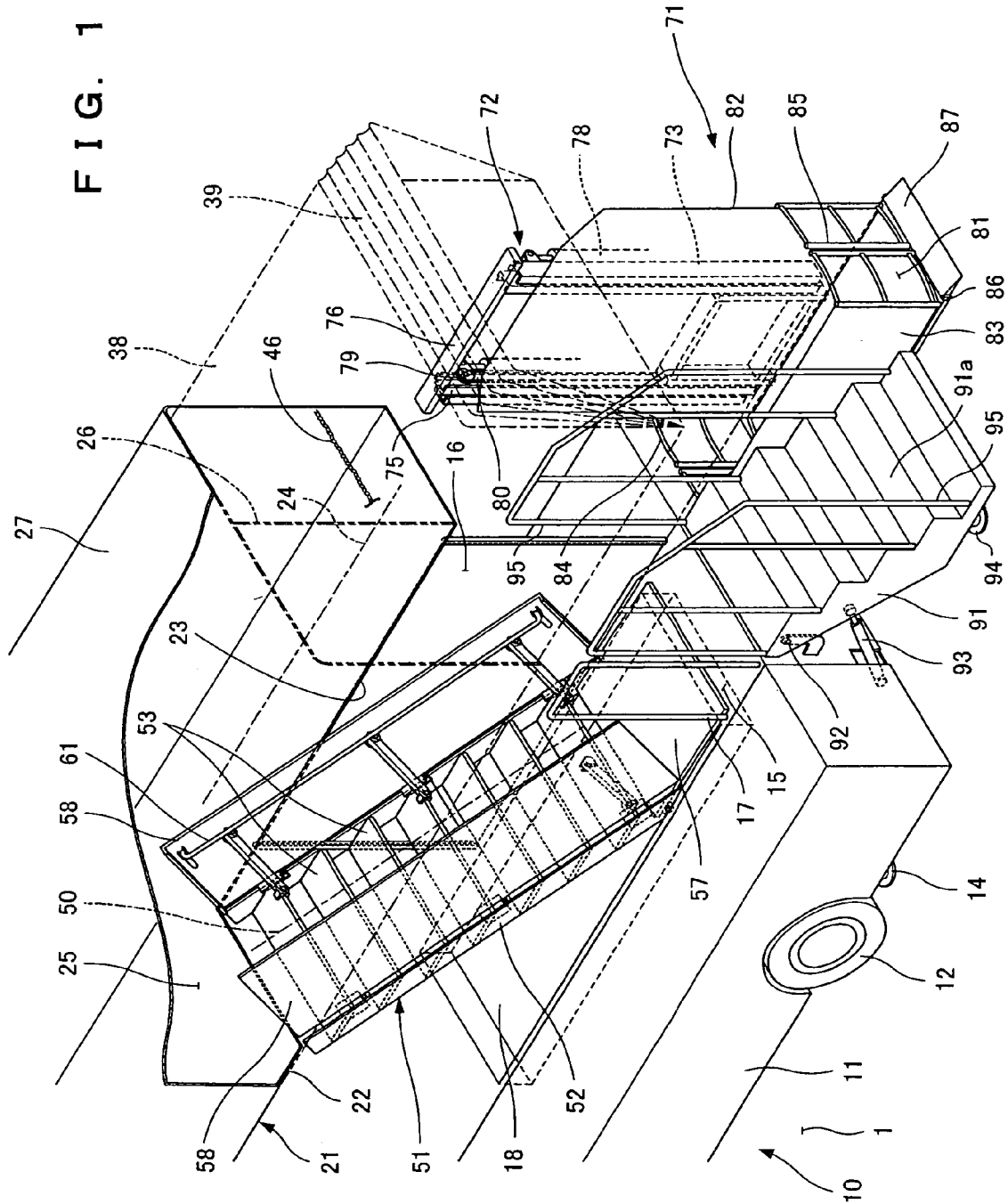
FIG. 1 is a partly cutaway perspective view of the rear of a vehicle for passenger entry and exit according to Embodiment 1 of the present invention.

Best Mode for Carrying Out the Invention

Preferred embodiments of a vehicle for passenger entry and exit according to the present invention will be described below with reference to the drawings.

Embodiment 1

First, a vehicle for passenger entry and exit according to Embodiment 1 of the present invention will be described with reference to FIGS. 1 to 12.

In FIGS. 1 to 4, a vehicle body (car body) 11 of a vehicle for passenger entry and exit 10 has wheel devices 12 at the front and rear of the bottom of the vehicle body and on each of the right side and the left side of the vehicle body. Appropriate ones of the wheel devices 12 are of a driven type so that the vehicle for passenger entry and exit 10 can travel controllably on a ground surface 1 continuous with a runway. An operation room 13 is provided on the front end of the vehicle body 11, at one side in the width direction thereof, for example, at the left side thereof. Outriggers (positioning or fixing devices) 14 are provided at the bottom of the vehicle body 11, close to the respective wheel devices 12. Moreover, a floor section 15 as a landing is provided on the top surface of one side of the rear of the vehicle body 11, for example, the left side of the rear of the vehicle body 11.

A lifting floor device 21 having a floor body 22 lifted and lowered by a lifting drive device 35 is provided above the vehicle body 11, at a position located away from the operation room 13. That is, the lifting floor device 21 has the floor body 22 positioned above the vehicle body 11. The lifting drive device 35 is provided between the floor body 22 and the vehicle body 11.

An example of the lifting drive device 35 is composed of a pantograph-type link mechanism 36 provided between the floor body 22 and the vehicle body 11 and a lifting hydraulic cylinder (an example of a lifting device) 37 provided between the link of the link mechanism 36 and the vehicle body 11. An intermediate section duct body 27 is disposed on the floor body 22 side. The intermediate section duct body 27 is shaped like a gate which covers a space above the floor body 22 and has a top plate formed to be horizontal in a front-to-back direction.

The floor body 22 has a cutout 23 at one side in the width direction thereof, for example, at the left side thereof, at the rear half thereof. The other side of the floor body 22, that is, the right side thereof, constitutes a passage 24 for a physically handicapped person. That is, the front half (a front-to-back part of the floor body 22 corresponding to about one third thereof) of the floor body 22 constitutes a wide common passage 25. The rear half (a front-to-back part of the floor body 22 corresponding to about two-thirds thereof) of the floor body 22 is divided into two pieces in the width direction. The left side of the rear half corresponds to the cutout 23. The right side of the rear half corresponds to the passage 24 for a physically handicapped person connected to the common passage 25. Here, a partition 26 is provided upright at the cutout 23-side end of the passage 24 for a physically handicapped person. The intermediate section duct body 27 is formed to cover the space above the floor body 22, including the cutout 23.

A front floor body 28 is provided on the floor body 22 so as to be slidable on the floor body 22 in the front-to-back direction. That is, the rear half of the front floor body 28 is placed on the common passage 25 of the floor body 22. The front half of the front floor body 28 is disposed so as to project frontward from the floor body 22. A support bar 29 is located between a frontward projecting part of the floor body 28 and the vehicle body 11. A recessed cutout 30 is formed at the front half of the front floor body 28, in the center thereof in a lateral direction to allow a fuselage door (described below) of a small-sized airplane to be opened and closed. A slidable floor plate 31 extending in the front-to-back direction is provided on the front floor body 28 to open and close the recessed cutout 30.

A front duct body 32 covering a space above the front floor body 28 is provided on the front floor body 28 continuously with the front floor body 28. The front duct body 32 is shaped like a gate and has a top plate section formed to be horizontal in the front-to-back direction. The rear half of the front duct body 32 is internally fitted into the front half of the intermediate section duct body 27. A front top body 33 is provided at the front of the duct body 32. Moreover, a rear duct body 38 covering the stairway section and the lifting table device (both will be described below) is provided continuously with the intermediate section duct body 27 so as to extend rearward from the rear end of the intermediate section duct body 27. The rear duct body 38 is shaped like a gate and has a top plate section formed to be horizontal in the front-to-back direction. A rear top body 39 is provided at the rear end of the rear duct body 38.

Here, a bridge plate 41, an upper operation panel 42, a television monitor 43, a television camera 44, and the like are provided in a part of the front floor body 28. Furthermore, a television camera 45 and the like are provided in a part of the floor body 22. A rope body 46 made up of a chain or the like is removably provided at a rear end of the passage 24 for a physically handicapped person. The members 22 to 46 and the like constitute an example of the lifting floor device 21.

A partition 16 extending upright from the vehicle body 11 is positioned at an end of the cutout 23 located closer to the passage 24 for a physically handicapped person. A handrail body 17 is provided upright at the left end of the floor section 15.

The cutout 23 has a stairway device 51 forming a passage 50 for an able-bodied person between the rear position of the common passage 25 of the floor body 22 and the front position of the floor section 15 of the vehicle body 11. The stairway device 51 is composed of side frames 52 positioned at laterally opposite sides thereof and a large number of stair treads 53 provided between the opposite side frames 52. The upper end (front end) of each of the side frames 52 is coupled to the floor body 22 so that the side frame is pivotable relative to the floor body 22 via a lateral shaft 54. The lower end (rear end) of the side frame 52 is received on the vehicle body 11. The side frames 52, the stair treads 53, and the like constitute a stairway body.

That is, a recess section 18 is formed at the front position of the floor section 15 of the vehicle body 11 so that the stairway device 51 can be fitted into the recess section 18. Guide rollers 55 provided at the lower end (rear end) of the corresponding side frame 52 are idly rotatably received on an upward top surface 18a of the recess section 18. The front end of a guiding stair tread 57 is relatively pivotably coupled to the lower end (rear end) of each of the side frames 52 via a lateral pin 56.

Thus, when a lifting hydraulic cylinder 37 in the lifting drive device 35 performs a contracting operation to lower the floor body 22, the stairway device 51 can place the side frames 52 horizontally to fit the side frames 52 into the recess section 18. At this time, the guiding stair tread 57 is positioned on the floor section 15 so as to span almost the overall length of the floor section 15. Furthermore, when the lifting hydraulic cylinder 37 performs an expanding operation to lift the floor body 22, the stairway device 51 can convert the group of stair treads 53 into a horizontal stairway form and tilt the side frames 52 through a predetermined angle. At this time, the rear end of the guiding stair tread 57 is positioned on the front end of the floor section 15 to close the rear of the recess section 18, which is open upward.

Movable members 58 each of which can be placed upright and over sideways are provided at the respective sides of the stairway device 51. That is, each of the movable members 58 is composed of a body section 59 shaped like a rectangular plate frame, a floor surface section 60 positioned in the upward part of the body section 59 when the movable member 58 is placed over sideways, and a handrail section 61 that projects inward from the inner surface of the upper end of the body section 59 when the movable member 58 is placed upright. One side (lower end) of the movable member 58 is coupled to the upper side of the corresponding one of the side frames 52 of the stairway device 51 via a front-to-back shaft 62 so that the movable member 58 can be placed upright and over sideways with respect to the side frame 52. In this case, a slidable stopper 63 is provided between the side frame 52 side and the body section 59. Furthermore, the handrail section 61 is pivotably coupled to the body section 59 via a front-to-back pin 64. The handrail section 61 is adapted as follows. When placed upright, the handrail section 61 is positioned so as to project horizontally inward from the inner surface of the upper end of the body section 59. When placed over sideways, the handrail section 61 is housed in the body section 59. A biasing device 65 biasing the stairway device 51 downward is provided between the side frame 52 and the floor body 22.

The thus configured movable members 58 are adapted so that when the floor body 22 is lowered to place the stairway device 51 horizontally and the movable members 58 are placed over sideways around the front-to-back shaft 62, the upward surface of the floor surface section 60 forms the passage 50 for an able-bodied person. At this time, the handrail section 61 pivots via the front-to-back pin 64 and is housed in the body section 59, and the floor surface section 60 is placed at the same level (or substantially the same level; this also applies to the description below) as the top surfaces of the floor section 15 and the floor body 22. Furthermore, the movable members 58 are adapted so that when the floor body 22 is lifted to tilt the stair treads (stair tread group) 53 so that the stair tread group is converted into a horizontal stairway form, the movable members 58 are placed upright around the front-to-back shaft 62 to form side covers. At this time, the handrail section 61 is positioned by pivoting via the front-to-back pin 64 to project horizontally inward from the inner surface of the upper end of the body section 59. The members 52 to 65 and the like constitute an example of the stairway device 51.

A stairway section 91 is provided behind the floor section 15 of the vehicle body 11. That is, the upper part of the front end of the stairway section 91 is coupled to the rear end of the floor section 15 via a lateral shaft 92 so as to be pivotable in a vertical direction. A pivoting hydraulic cylinder (an example of a pivoting device) 93 is provided between the vehicle body 11 and the stairway section 91. A landing body 94 is provided at the lower part of the rear end of the stairway section 91. Handrail bodies 95 are provided at respective laterally opposite sides of the stairway section 91 so as to extend upright.

Figure 2:
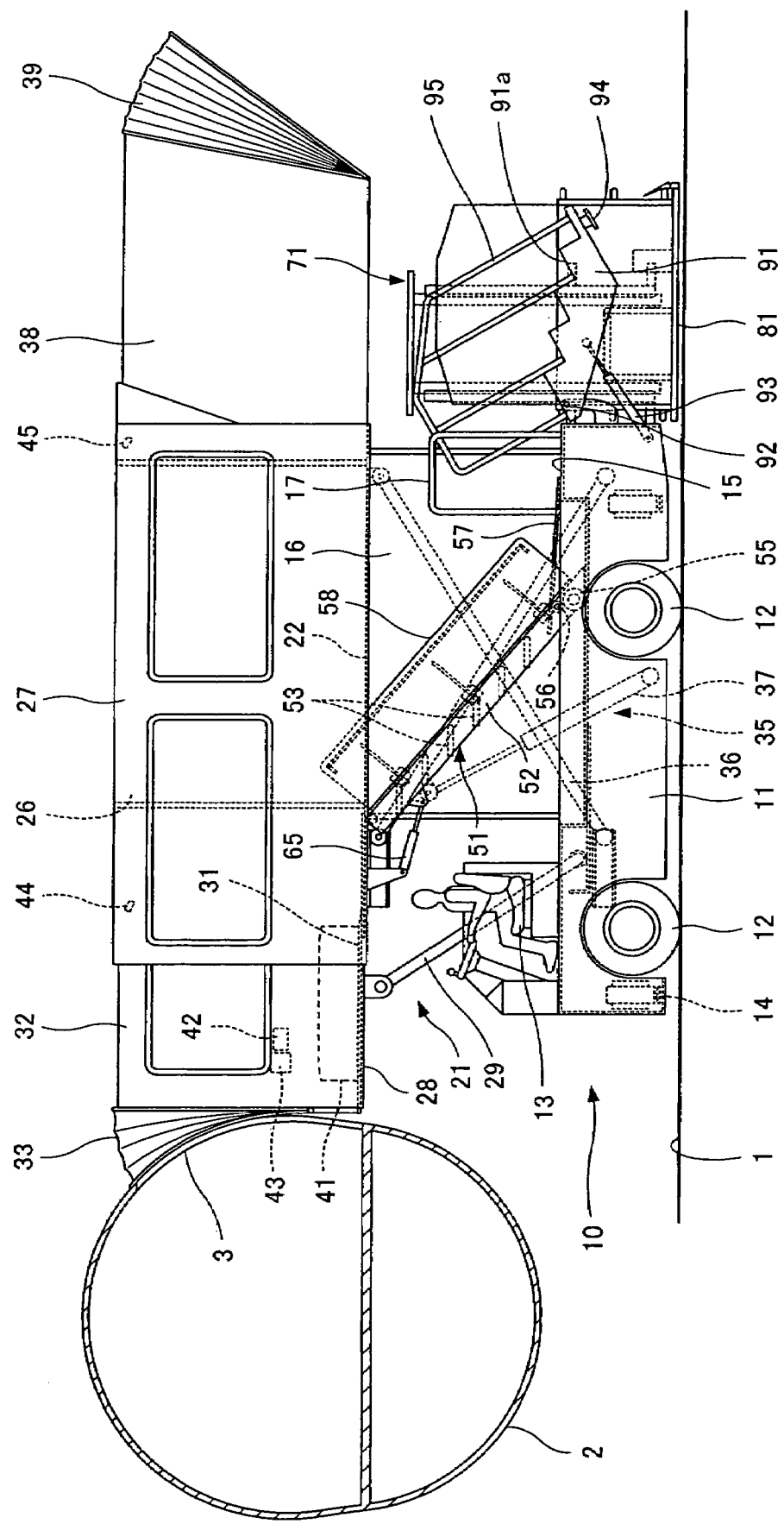
FIG. 2 is a side view showing that the vehicle for passenger entry and exit is approaching a medium-sized airplane.
Figure 4:
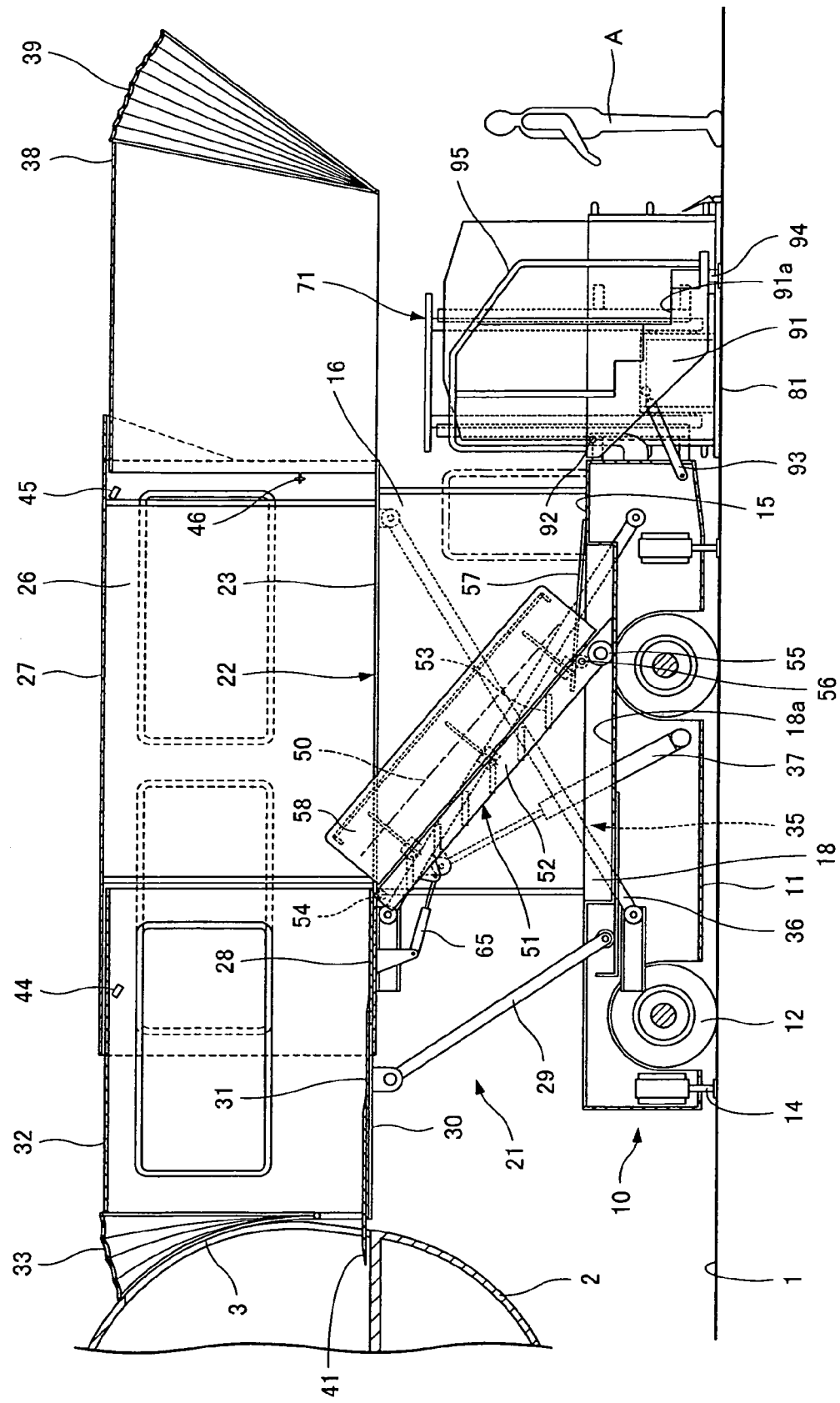
FIG. 4 is a vertically sectional view showing how a passenger enters the medium-sized airplane using the vehicle for passenger entry and exit.

When the pivoting hydraulic cylinder 93 performs a contracting operation to cause the thus configured stairway section 91 to pivot downward around the lateral shaft 92 to allow the landing body 94 to land on the ground surface 1, the stairway section 91 takes a use posture in which a stairway-like top surface 91a connects the floor section 15 to the ground surface 1 (see FIGS. 1 and 4). Furthermore, when the pivoting hydraulic cylinder 93 performs an expanding operation to cause the stairway section 91 in the use posture to pivot upward around the lateral shaft 92, the stairway-like top surface 91a can be faced upward to bring the stairway section 91 into a nonuse posture as shown in FIG. 2.

A lifting table device 71 is provided behind the vehicle body 11, at the other side thereof in the width direction, that is, at the right side thereof. The lifting table device 71 is made up of a lifting drive section 72 provided at the rear end of the vehicle body 11 and a lifting table 81 that can be moved upward and downward in the vertical direction by the lifting drive section 72. The lifting table 81 is adapted so that, when lifted, the lifting table 81 can be connected to the rear end of the passage 24 for a physically handicapped person in the floor body 22.

That is, the lifting drive section 72 is in lift device form and has a front-to-back pair of outer masts 73 fixedly coupled to the vehicle body 11 so as to extend upright and coupling members 74 provided between the front and rear outer masts 73 at a plurality of vertical positions. Both outer masts 73 are shaped like U-rails and extend upright so that open parts of the outer masts are located opposite each other. A front-to-back pair of inner masts 75 is disposed between the front and rear outer masts 73. Coupling members 76 are provided between the upper ends of the front and rear inner masts 75 and between the lower ends thereof. Both inner masts 75 are shaped like U-rails and extend upright so that the open parts of the outer masts are located opposite each other. A lateral guide roller and a front-to-back guide roller fitted on the outer masts 73 side and guided are provided under both inner masts 75. The inner masts 75 are thus adapted so as to be controllably lifted and lowered with respect to the outer masts 73.

A lifting member 77 is disposed between the front and rear inner masts 75. The lifting member 77 has a lateral guide roller and a front-to-back guide roller fitted on the inner mast 75 side and guided. The lifting member 77 is thus adapted so as to be controllably lifted and lowered with respect to the inner masts 75. The outer end part of the lifting table 81 is coupled to the lifting member 77. The lifting table 81 is thus adapted so as to be controllably lifted and lowered integrally with the lifting member 77.

A lifting hydraulic cylinder (an example of a lifting device) 78 is provided between the outer masts 73 and the inner masts 75. That is, the lifting hydraulic cylinder 78 has a cylinder body with a lower end fixed to the outer mast 73 side, and an upper piston rod coupled to the inner mast 75-side upper end thereof. A sprocket 79 is rotatably provided at the upper end of each of the inner masts 75. The outer lower end of a chain 80 wound around the sprocket 79 is coupled to the outer mast 73 side. The inner lower end of the chain 80 is coupled to the lifting table 81 side. Therefore, by allowing the lifting hydraulic cylinder 78 to perform an expanding operation and a contracting operation, the inner masts 75 can be lifted and lowered with respect to the outer masts 73. The sprockets 79 integrated with the inner masts 75 are thus lifted and lowered to allow the lifting table 81 to be lifted and lowered via the chains 80. The members 73 to 80 and the like constitute an example of the lifting drive section 72.

At sides of the lifting table 81, a side cover 82 that is long in the vertical direction is provided on the side of the lifting drive section 72, and a side cover 83 that is short in the vertical direction is provided on the side of the stairway device 51. An openable and closable front door 84 is provided at the front of the lifting table 81. An openable and closable rear door 85 is provided at the rear of the lifting table 81. Here, each of the doors 84, 85 is divided into a right piece and a left piece and adapted to be controllably opened and closed by allowing the right and left pieces to pivot in the lateral direction as in the case of a double hinged door. That is, both doors 84, 85 are closed to surround the periphery of a space above the lifting table 81 together with the side covers 82, 83. The doors 84, 85 are also adapted so that the front door 84 is opened by pivoting frontward and in the lateral direction, whereas the rear door 85 is opened by pivoting backward and in the lateral direction.

An approach slope 87 is provided at the rear end of the lifting table 81 via a lateral pin 86 so as to be pivotable in the vertical direction. Furthermore, a lifting operation panel 88 is provided on a part of the long side cover 82. The members 72 to 88 constitute an example of the lifting table device 71. The rear duct body 38 is adapted to cover a space above the stairway device 51 and the lifting table device 71.

Now, entry and exit using the vehicle for passenger entry and exit 10 will be described.

First, how to enter a medium-sized airplane will be described with reference to FIGS. 1 to 6 and 11. As shown in FIG. 2, the vehicle for passenger entry and exit 10 is operated in the operation room 13 to travel closer to the fuselage 2 of the medium-sized airplane. The expanding operation of the lifting hydraulic cylinder 37 has lifted the floor body 22 of the lifting floor device 21 via the link mechanism 36. Thus, the stairway device 51 has converted the stair tread 53 group into a horizontal stairway form to tilt the side frames 52 through the predetermined angle. The movable members 58 of the stairway device 51 are placed upright around the front-to-back shaft 62 to form the side covers and to position the handrail sections 61 so as to project horizontally inward from the inner surface of the upper end of the body section 59. Moreover, the rear end of the guiding stair tread 57 is positioned on the front end of the floor section 15 to close the rear of the recess section 18, which is open upward. Furthermore, the expanding operation of the pivoting hydraulic cylinder 93 has caused the stairway section 91 to pivot upward to take the nonuse posture with the stairway-like top surface 91a facing upward. Moreover, the approach slope 87 of the lifting table device 71 has pivoted toward the top of the lifting table 80 to slightly lift and separate the lifting table 80 away from the ground surface 1.

As described above, the vehicle for passenger entry and exit 10 is operated to travel to the fuselage 2. The vehicle for passenger entry and exit 10 is then stopped with the front floor body 28 located sufficiently close to the platform 3. Then, as shown in FIG. 4, the outriggers 14 are lowered to land on the ground surface 1 to position the vehicle for passenger entry and exit 10. Then, an operator or another worker operates the upper operation panel 42 on the front floor body 28 to allow the lifting hydraulic cylinder 37 to perform the expanding and contracting operations to make final adjustment (fine-tuning) of the lifting position of the floor body 22 (front floor body 28). Then, the weatherproof front top body 33 is installed on the fuselage 2 side. Immediately before or after the installation, the fuselage door is opened to open the platform 3. Furthermore, the slidable floor plate 31 is initially or operatively positioned at the front end side to close the recessed cutout 30. Then, the bridge plate 41 placed against the wall on the floor body 28 is laid on the slidable floor plate 31 so as to cover a part of the platform 3 as shown in FIGS. 3 and 4.

Moreover, the pivoting hydraulic cylinder 93 performs the contracting operation to cause the stairway section 91 to pivot downward to allow the landing body 94 to land on the ground surface 1. The stairway section 91 thus takes the use posture in which the stairway-like top surface 91a connects the floor section 15 to the ground surface 1, as shown in FIGS. 1 and 4. Furthermore, the lifting table device 71 lowers the lifting table 81 to a lowering limit and causes the approach slope 87 to pivot rearward and downward to land on the ground surface 1. Thus, the vehicle for passenger entry and exit is ready to allow an able-bodied person A and a physically handicapped person B to enter the medium-sized airplane.

Figure 3:
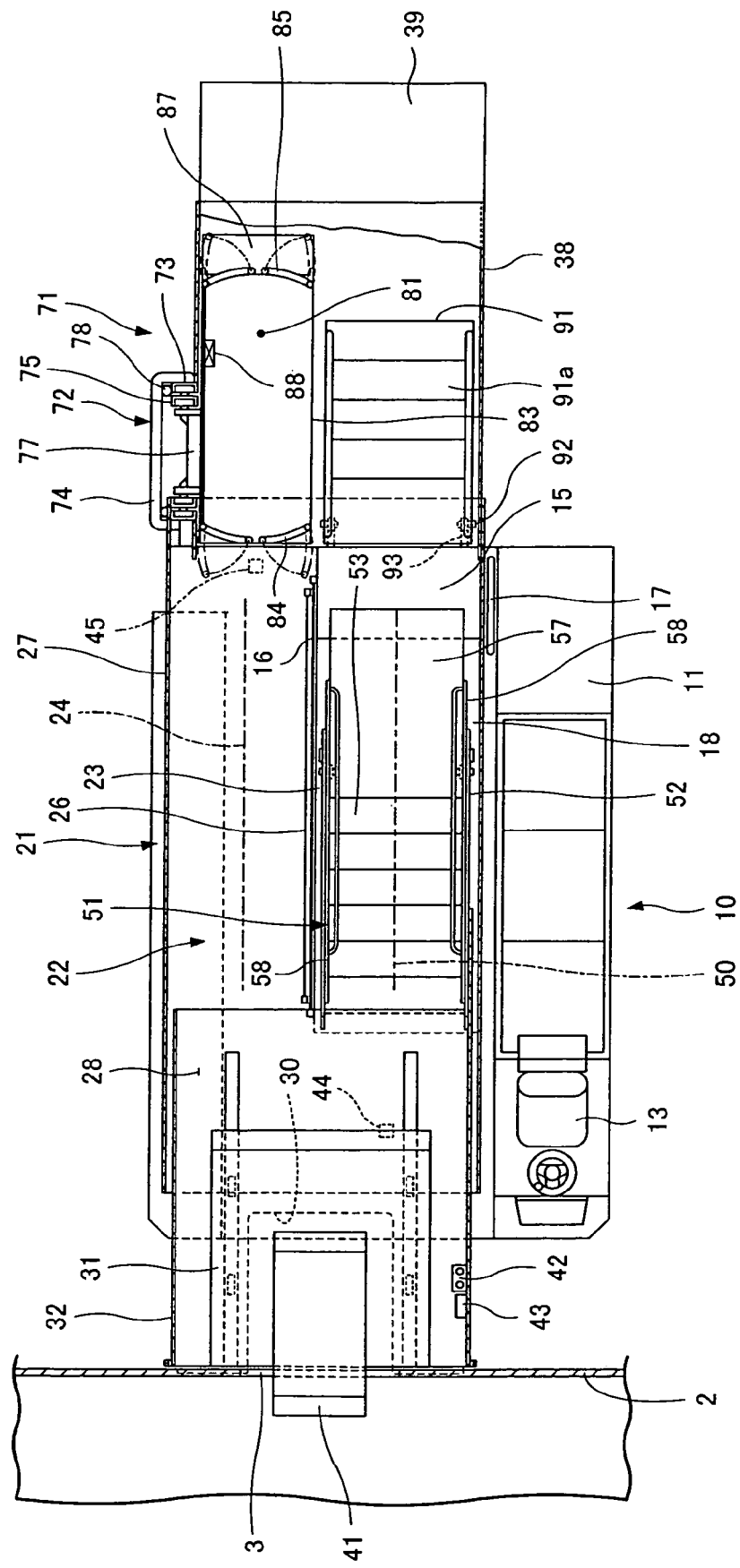
FIG. 3 is a partly cutaway plan view showing that the vehicle for passenger entry and exit is ready to allow passengers to enter the medium-sized airplane.
Figure 11:
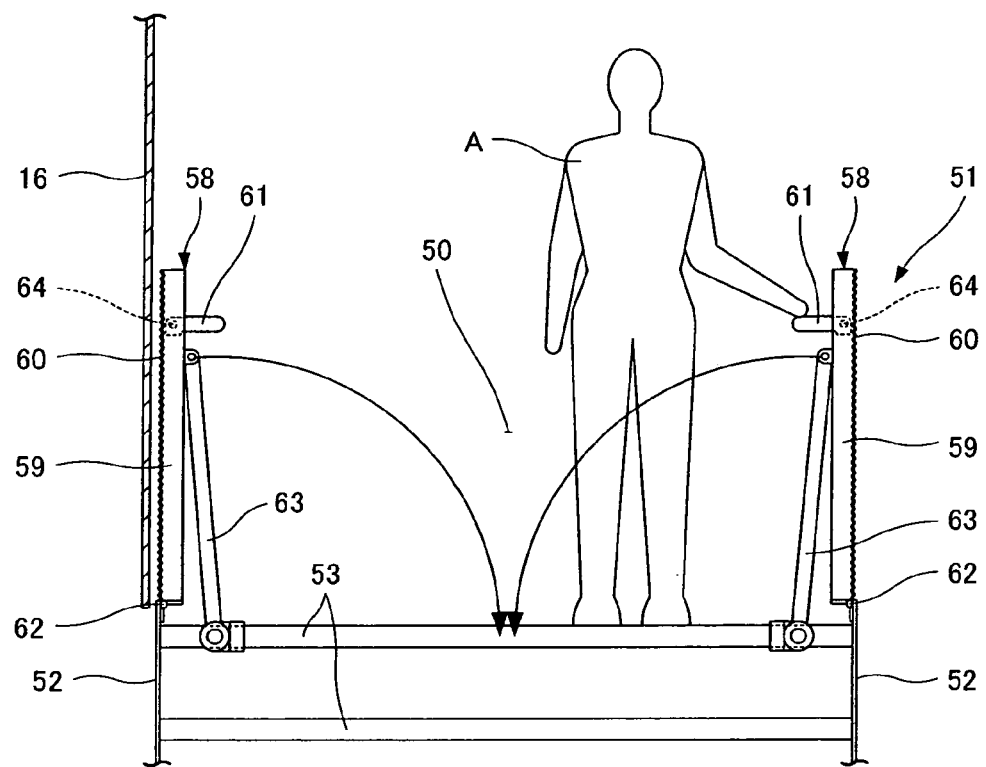
FIG. 11 is a front view showing how to use a stairway section of the vehicle for passenger entry and exit.

Thus, in FIGS. 1, 3, and 4, the able-bodied person A can walk along the ground surface 1, the stairway-like top surface 91a of the stairway section 91, the floor section 15, the guiding stair tread 57, the stair treads 53 (the passage 50 for an able-bodied person) of the stairway device 51, the front floor body 28, the slidable floor plate 31, and the bridge plate 41 and then enter the airplane through the platform 3. At this time, in the stairway section 91, the able-bodied person can walk stably, for example, without falling sideways owing to the handrail bodies 95 provided at the opposite sides. Furthermore, in the floor section 15 and on the guiding stair tread 57, the able-bodied person can walk stably, for example, without falling sideways owing to the partition 16 and handrail body 17 provided at the respective sides. Moreover, as shown in FIG. 11, the able-bodied person can walk stably on the stair treads 53 of the stairway device 51, that is, along the passage 50 for an able-bodied person, without falling sideways because of the movable members 58 placed upright so as to form the side covers and the handrail sections 61 projected inward from the inner surface of the upper end. The able-bodied person A can exit the airplane by walking in the opposite direction.

Figure 5:
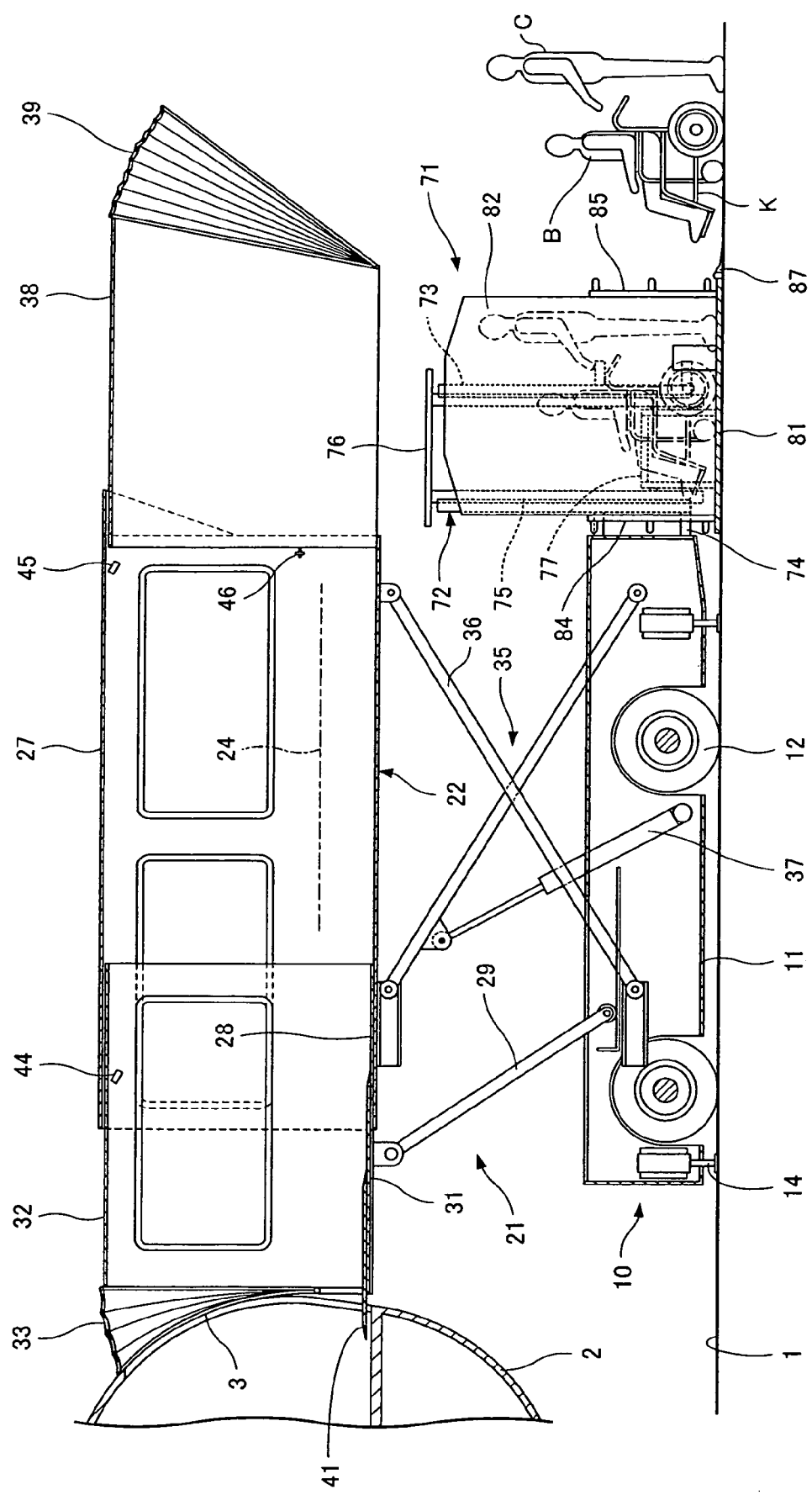
FIG. 5 is a vertically sectional view showing how the passenger enters the medium-sized airplane using the vehicle for passenger entry and exit.
Figure 6:
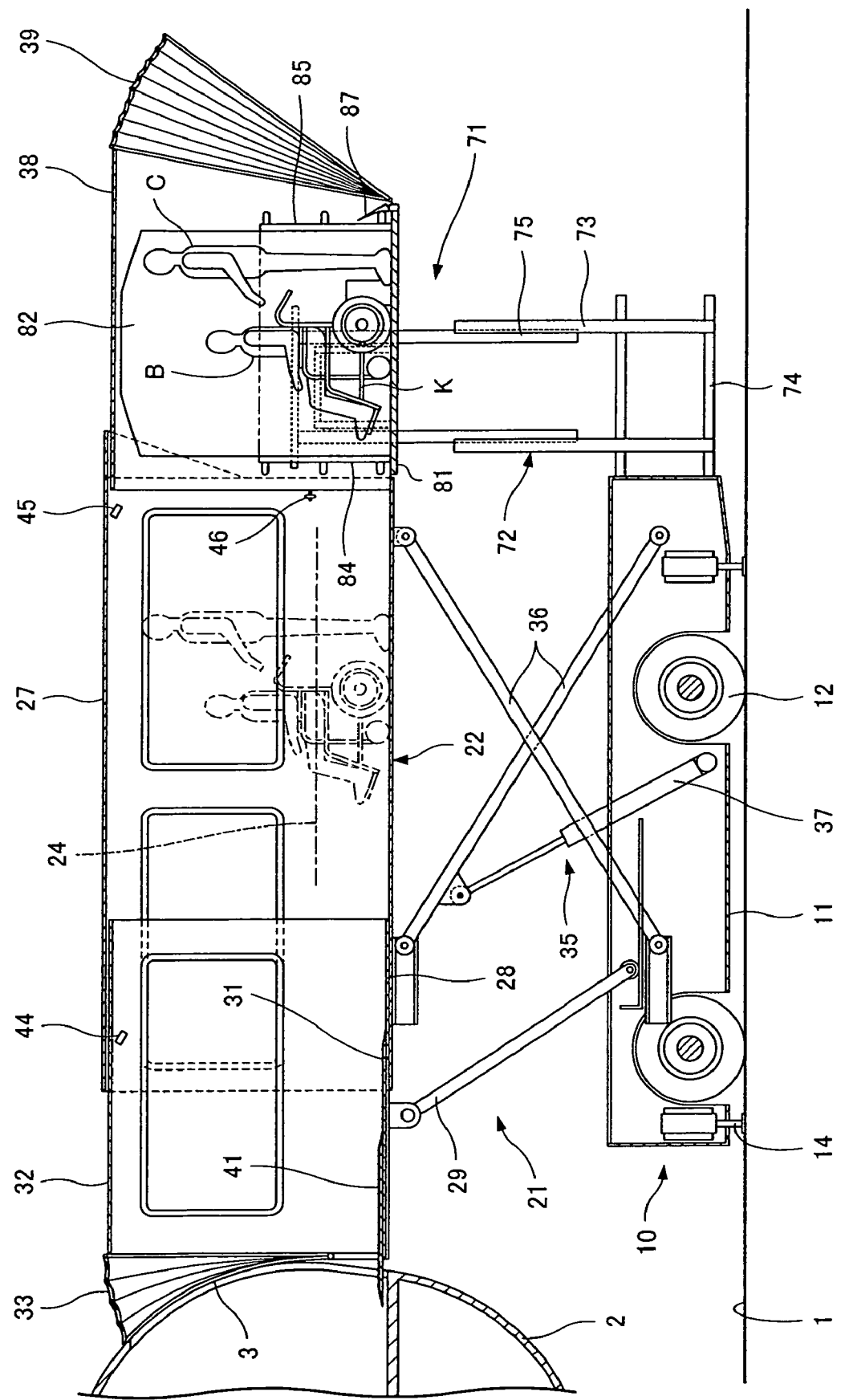
FIG. 6 is a vertically sectional view showing how the passenger enters the medium-sized airplane using the vehicle for passenger entry and exit.

Furthermore, if a passenger is the physically handicapped person B in a wheelchair K (or having difficulty stepping upstairs and downstairs), as shown by a dotted line in FIG. 3, the rear door 85 is opened rearward and in the lateral direction, so that the wheelchair K can be moved along the ground surface 1 and onto the lifting table 81 via the approach slope 87 as shown by a solid line and a dotted line in FIG. 5. The wheelchair K is moved onto the lifting table 81 by a crew member (or an attendant) C. Under the condition that a safety device (not shown) is in operation in connection with closure of the rear door 85, the crew member operates the lifting operation panel 88 to lift the lifting table 81.

The lifting table 81 can be lifted by allowing the lifting hydraulic cylinder 78 to perform the expanding operation to lift the inner masts 75 with respect to the outer masts 73 to lift the sprockets 79, integrated with the inner masts 75, and thus the chains 80, thus lifting the lifting member 77 with respect to the inner masts 75. At this time, both closed doors 84, 85 and side covers 82, 83 surround the periphery of the space above the lifting table 81, so that the lifting table 81 can be safely lifted, for example, without causing the wheelchair K to fall from the front or rear of the lifting table 81 or sideways. Furthermore, as shown by a solid line in FIG. 6, the lifting table 81 is lifted so that the top surface of the lifting table 81 is located at the same level as the top surface of the passage 24 for a physically handicapped person in the floor body 22. This location is detected by a level detecting device (not shown) to allow the lifting table 81 to be automatically stopped. The lifting table 81 can thus be connected to the rear end of the passage 24 for a physically handicapped person (so that the lifting table 81 is continuous with the passage 24 for a physically handicapped person).

Then, as shown by a dotted line in FIG. 3, the front door 84 is opened forward and in the lateral direction, and the rope body 46 is removed. Subsequently, as shown by a dotted line in FIG. 6, the crew member C moves (transfers) the wheelchair K on the lifting table 81, onto the passage 24 for a physically handicapped person in the floor body 22. At this time, the wheelchair K is moved stably, without falling sideways owing to the partition 26 and the intermediate section duct body 27 provided at the respective sides. The wheelchair K on the passage 24 for a physically handicapped person is then moved along the floor body 28, the slidable floor plate 31, and the bridge plate 41. The physically handicapped person can thus enter the airplane through the platform 3 (the wheelchair K can be carried into the airplane).

The lifting table 81 stopped and connected to the rear end of the passage 24 for a physically handicapped person is lowered by closing the front door 84, setting the rope body 46, and then operating the lifting operation panel 88. The lowering of the lifting table 81 can be performed by allowing the lifting hydraulic cylinder 78 to perform the contracting operation to lower the inner masts 75 with respect to the outer masts 73 to lower the sprockets 79, integrated with the inner masts 75, to lower the chain 80, thus lowering the lifting member 77 with respect to the inner masts 75. When lowered to the lowering limit, as shown in FIGS. 1 and 4, the level detecting device (not shown) detects that the approach slope 87 has landed on the ground surface 1 to automatically stop the lowering of the lifting table 81. The lifting table 81 can thus be returned to the initial condition.

The operation is repeated to allow a plurality of physically handicapped persons B, that is, a plurality of wheelchairs K to sequentially enter the airplane. Furthermore, a physically handicapped person who can walk but has difficulty stepping upstairs and downstairs may use the wheelchair K or stand on the lifting table 81, which is then lifted, and then step onto the airplane. The physically handicapped person B can exit the airplane by, for example, moving the wheelchair K in the opposite direction.

When a crew member directs boarding in a section such as the front floor body 28, the able-bodied person A and the physically handicapped person B can simultaneously and efficiently step or move onto the medium-sized airplane. The able-bodied person A and the physically handicapped person B can also simultaneously and efficiently exit the medium-sized airplane. For example, while the plurality of wheelchairs K (or the single wheelchair K) having passed through the platform 3 are waiting on the passage 24 for a physically handicapped person to exit the airplane, the able-bodied person A can exit the airplane utilizing the passage 50 for an able-bodied person.

Figure 7:
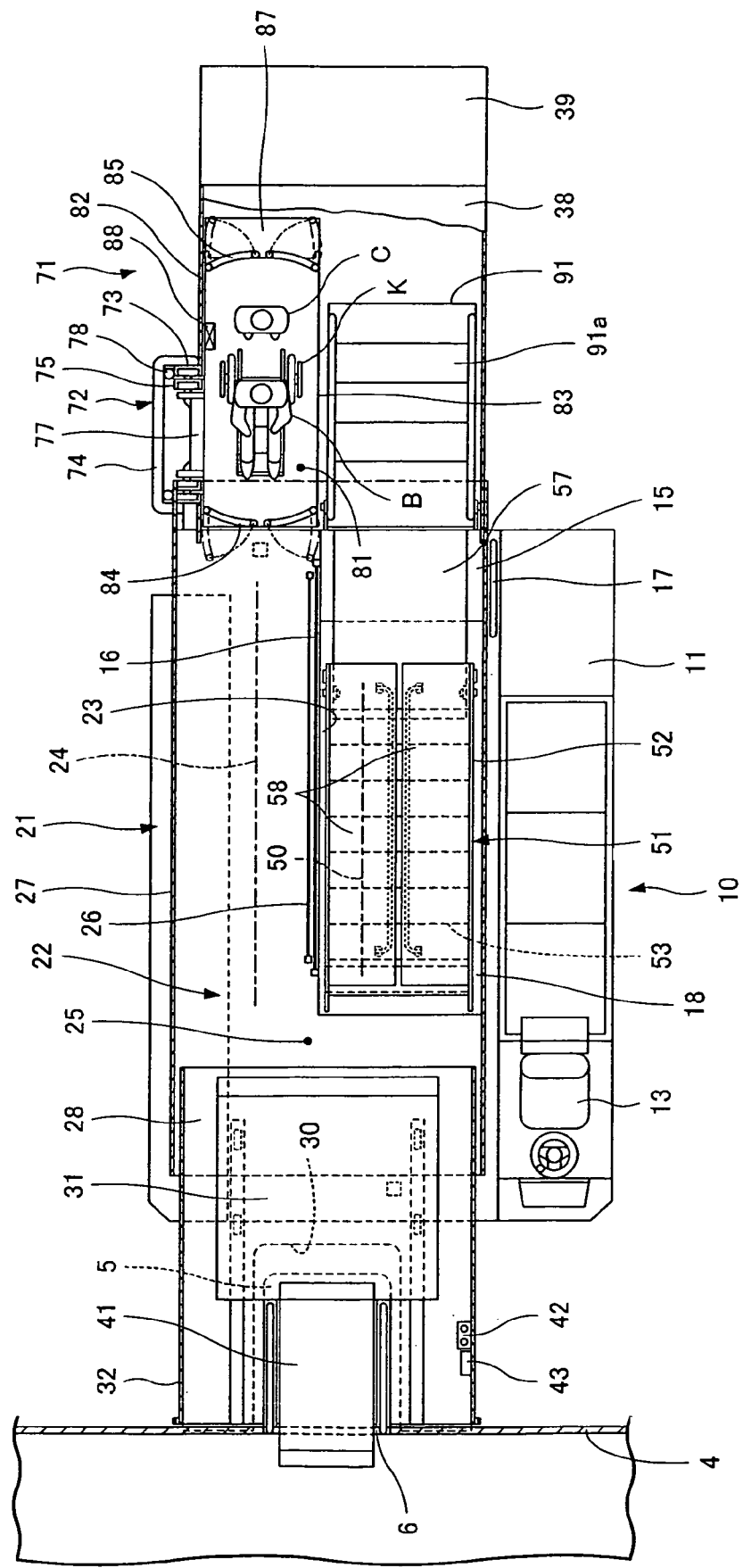
FIG. 7 is a partly cutaway plan view showing how a passenger enters a small-sized airplane using the vehicle for passenger entry and exit.

Now, how to enter a small-sized airplane will be described with reference to FIGS. 7 to 10 and 12. As shown in FIG. 7, the vehicle for passenger entry and exit 10 is operated in the operation room 13 to travel to the fuselage 4 of the small-sized airplane. The contracting operation of the lifting hydraulic cylinder 37 has lowered the floor body 22 of the lifting floor device 21, enabling the stairway device 51 to be fitted into the recess section 18 with the side frames 52 placed horizontally. The movable members 58 of the stairway device 51 are placed over sideways around the front-to-back shaft 62 so that the upward surface of the floor surface section 60 forms the passage 50 for an able-bodied person. At this time, the handrail section 61 is housed in the body section 59, and the floor surface section 60 is connected to the floor section 15 and the floor body 22 so as to lie at the same level as the floor section 15 and the floor body 22. The guiding stair tread 57 is positioned on the floor section 15 so as to span the overall length of the floor section 15. The expanding operation of the pivoting hydraulic cylinder 93 has caused the stairway section 91 to pivot upward to take the nonuse posture with the stairway-like top surface 91*a* facing upward. The approach slope 87 of the lifting table device 71 has pivoted toward the top of the lifting table 81 to slightly lift and separate the lifting table 81 away from the ground surface 1.

As described above, the vehicle for passenger entry and exit 10 is operated to travel closer to the fuselage 4. The vehicle for passenger entry and exit 10 is then stopped with the floor body 28 located sufficiently close to a fuselage door 5. Then, the outriggers 14 are lowered to land on the ground surface 1 to position the vehicle for passenger entry and exit 10. Then, the operator or another worker operates the upper operation panel 42 on the front floor body 28 to allow the lifting hydraulic cylinder 37 to perform the expanding and contracting operations to make final adjustment (fine-tuning) of the lifting position of the floor body 22 (front floor body 28). Then, the weatherproof front top body 33 is installed on the fuselage 4 side.

Figure 8:
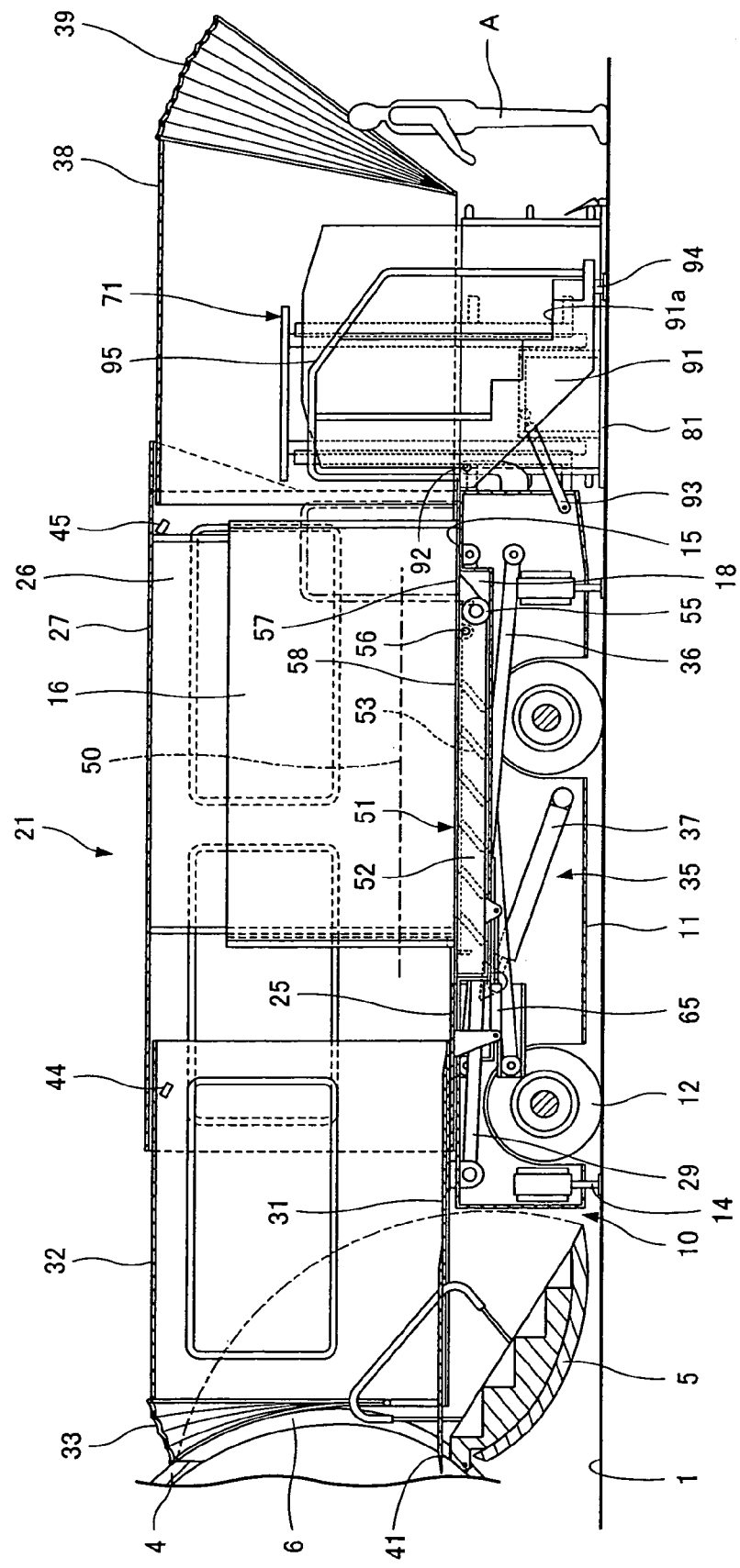
FIG. 8 is a vertically sectional view showing how the passenger enters the small-sized airplane using the vehicle for passenger entry and exit.

Then, the slidable floor plate 31 is moved (slid) rearward to completely open the recessed cutout 30. The fuselage door 5 is opened downward to open the platform 6. At this time, the fuselage door 5 can be opened smoothly through the recessed cutout 30. Subsequently, the slidable floor plate 31 is moved toward the front end to close the rear side of the recessed cutout 30. Then, the bridge plate 41 placed against the wall on the floor body 28 is laid on the slidable floor plate 31 so as to cover a part of the platform 6 as shown in FIGS. 7 and 8.

Moreover, the pivoting hydraulic cylinder 93 performs the contracting operation to cause the stairway section 91 to pivot downward to allow the landing body 94 to land on the ground surface 1. The stairway section 91 thus takes the use posture in which the stairway-like top surface 91*a* connects the floor section 15 to the ground surface 1. Furthermore, the lifting table device 71 lowers the lifting table 81 to a lowering limit and causes the approach slope 87 to pivot rearward and downward to land on the ground surface 1. Thus, the vehicle for passenger entry and exit is ready to allow the able-bodied person A and the physically handicapped person B to enter the small-sized airplane.

Figure 12:
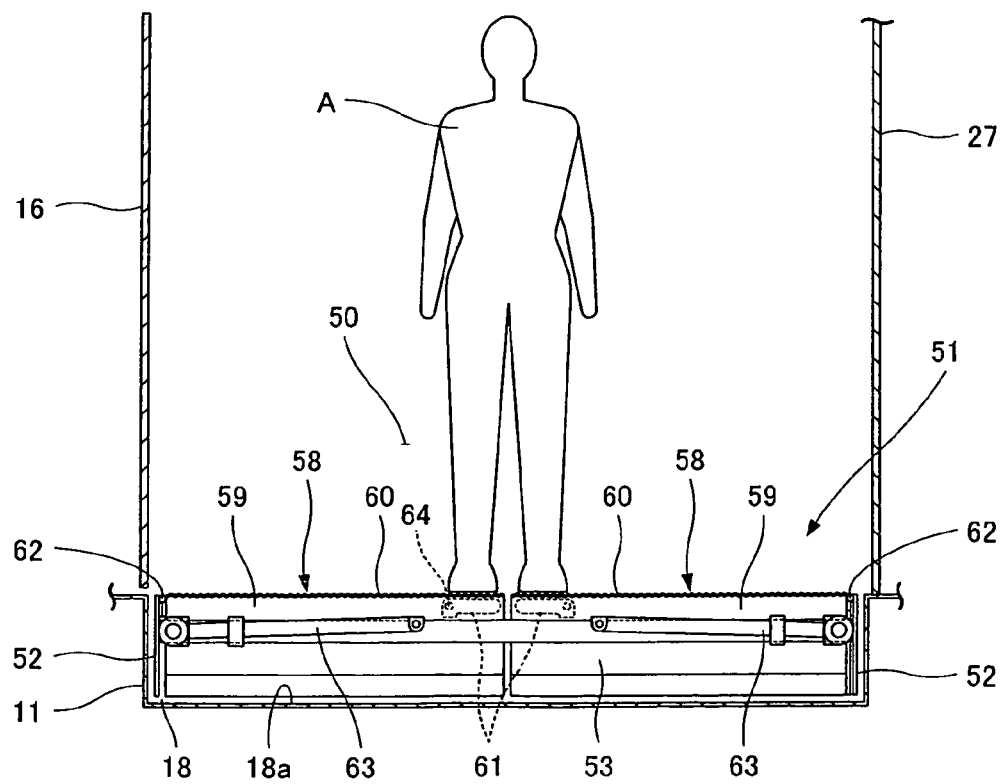
FIG. 12 is a front view showing how to use the stairway section of the vehicle for passenger entry and exit.

Thus, the able-bodied person A can walk along the ground surface 1, the stairway-like top surface 91*a* of the stairway section 91, the guiding stair tread 57, the upward surface (the passage 50 for an able-bodied person) of the floor surface section 60 of the horizontal movable members 58, the common passage 25 of the floor body 22, the front floor body 28, the slidable floor plate 31, and the bridge plate 41 and then enter the airplane through the platform 6. At this time, in the stairway section 91, the able-bodied person can walk stably, for example, without falling sideways owing to the handrail bodies 65 provided at the opposite sides. Furthermore, on the guiding stair tread 57, the able-bodied person can walk stably, for example, without falling sideways owing to the partition 16 and handrail body 17 provided at the respective sides. Moreover, as shown in FIG. 12, the able-bodied person can walk stably on the part of the stairway device 51, that is, along the passage 50 for an able-bodied person, for example, without falling sideways because of the movable members 58 placed over sideways so that the upward surface of the floor surface section 60 forms the passage 50 for an able-bodied person as well as the partition 16 and the intermediate section duct body 27 provided at the respective sides. The able-bodied person A can exit the airplane by walking in the opposite direction.

Furthermore, if a passenger is the physically handicapped person B in a wheelchair or has difficulty in going up and down the stairs, that is, the physically handicapped person B in the wheelchair K, a procedure similar to that used for the medium-sized airplane can be carried out. That is, the rear door 85 is opened rearward and in the lateral direction, so that the wheelchair K can be moved along the ground surface 1 and onto the lifting table 81 via the approach slope 87 as shown by a solid line and a dotted line in FIG. 9. The wheelchair K is moved onto the lifting table 81 by the crew member (or attendant) C. Under the condition that the safety device (not shown) determines that the wheelchair K has been moved onto the lifting table 81, for example, that the rear door 85 has been closed, the crew member operates the lifting operation panel 88 to lift the lifting table 81.

Figure 10:
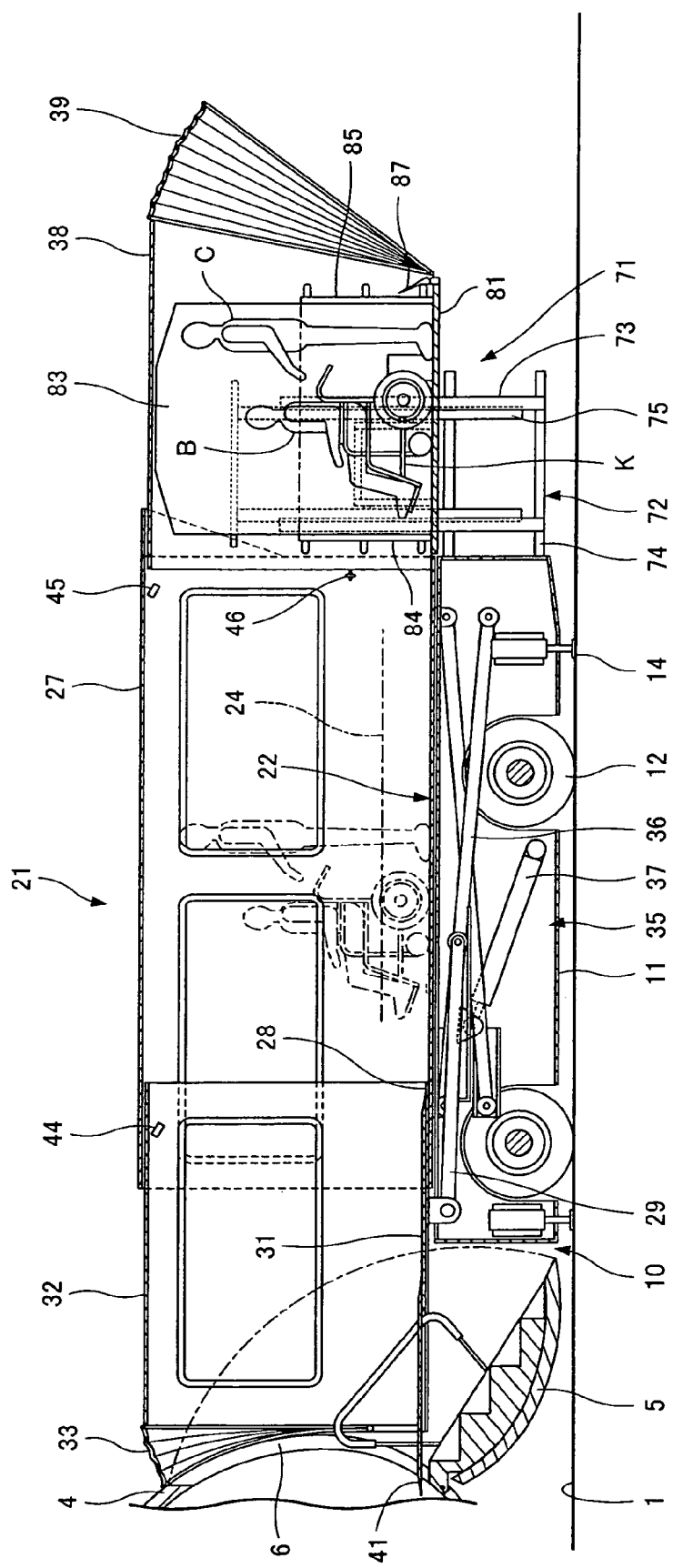
FIG. 10 is a vertically sectional view showing how the passenger enters the small-sized airplane using the vehicle for passenger entry and exit.

As shown in FIG. 10, the lifting table 81 is lifted so that the top surface of the lifting table 81 is located at the same level as the top surface of the passage 24 for a physically handicapped person in the floor body 22. This location is detected by the level detecting device (not shown) to allow the lifting table 81 to be automatically stopped. The lifting table 81 can thus be connected to the rear end of the passage 24 for a physically handicapped person (so that the lifting table 81 is continuous with the passage 24 for a physically handicapped person).

Figure 9:
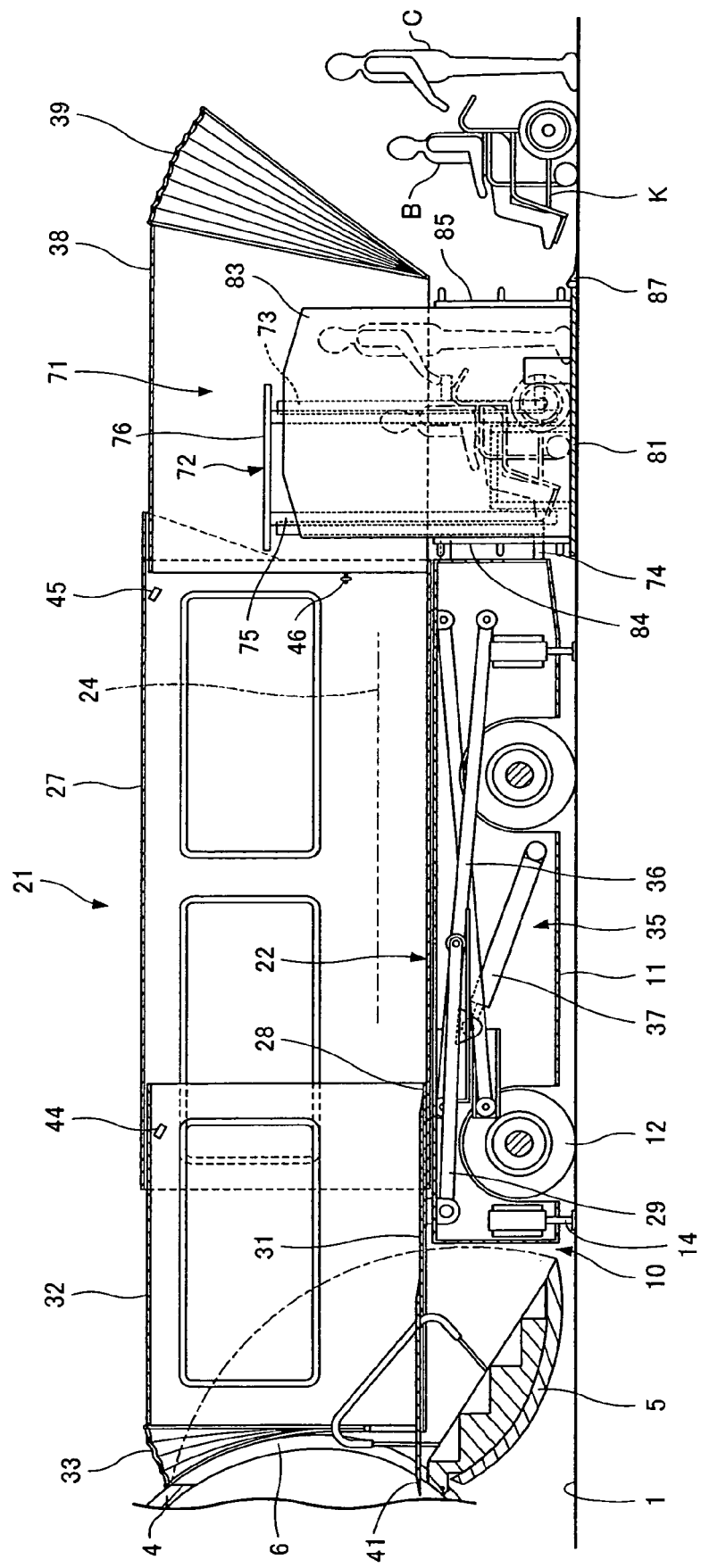
FIG. 9 is a vertically sectional view showing how the passenger enters the small-sized airplane using the vehicle for passenger entry and exit.

Then, the front door 84 is opened forward and in the lateral direction, and the rope body 46 is removed. Subsequently, as shown by a dotted line in FIG. 10, the crew member C moves (transfers) the wheelchair K on the lifting table 81, onto the passage 24 for a physically handicapped person in the floor body 22. The wheelchair K on the passage 24 for a physically handicapped person is then moved along the common passage 25, the front floor body 28, the slidable floor plate 31, and the bridge plate 41. The physically handicapped person can thus enter the airplane through the platform 6 (the wheelchair K can be carried into the airplane). The lifting table 81 stopped and connected to the rear end of the passage 24 for a physically handicapped person is lowered by closing the front door 84, setting the rope body 46, and then operating the lifting operation panel 88. The lifting table 81 can thus be returned to the initial condition as shown in FIG. 9.

The operation is repeated to allow the plurality of physically handicapped persons B, that is, the plurality of wheelchairs K to sequentially enter the airplane. Furthermore, a physically handicapped person who can walk but has difficulty stepping upstairs and downstairs may use the wheelchair K or stand on the lifting table 81, which is then lifted, and then step onto the airplane. The physically handicapped person B can exit the airplane by, for example, moving the wheelchair K in the opposite direction.

When a crew member directs boarding in a section such as the front floor body 28, the able-bodied person A and the physically handicapped person B can simultaneously and efficiently step or move onto the small-sized airplane. The able-bodied person A and the physically handicapped person B can also simultaneously and efficiently exit the small-sized airplane. For example, while the plurality of wheelchairs K (or the single wheelchair K) having passed through the platform 6 are waiting on the passage 24 for a physically handicapped person to exit the airplane, the able-bodied person A can exit the airplane utilizing the passage 50 for an able-bodied person.

The configuration and effects of Embodiment 1 described above will be described in brief.

That is, the vehicle for passenger entry and exit comprises the floor section formed at the rear of the vehicle body, at one side thereof in the lateral direction and the lifting floor device placed above the vehicle body and having the floor body lifted and lowered by the lifting drive device, the floor body having the cutout formed at one side of the floor body in the lateral direction, at the rear half thereof, the other side of the floor body being formed as the passage for a physically handicapped person, the stairway device for the passage for an able-bodied person being provided between the floor body and the floor section in the cutout, the stairway device being adapted so as to be placed horizontally by lowering the floor body and to be tilted with the stair tread group placed horizontally by lifting the floor body, the lifting table device being provided behind the vehicle body, at the other side in the lateral direction, the lifting table of the lifting table device being adapted so as to be lifted and controllably connected to the rear end of the passage for a physically handicapped person, the stairway section being provided behind the floor section of the vehicle body.

With this configuration, for entry to or exit from the medium-sized airplane, the vehicle body is allowed to travel to the fuselage of the medium-sized airplane. The lifting floor device has been driven by the lifting drive device to lift the floor body to tilt the stairway device through the predetermined angle with the stair tread group placed horizontally. The vehicle body is stopped with the floor body located close to the platform of the fuselage. The fuselage door is then opened to open the platform. Thus, the able-bodied person can walk along the stairway section, the floor section, the stair tread group (the passage for an able-bodied person) of the stairway device, and the floor body and then enter the airplane through the platform. Additionally, the able-bodied person can exit the airplane by walking in the opposite direction. Furthermore, if a passenger is the physically handicapped person who requires the wheelchair or has difficulty stepping upstairs and downstairs, the wheelchair or the passenger is moved from the ground surface onto the lifting table. The lifting table is then lifted (so as to be continuous with the passage for a physically handicapped person) so that the top surface of the lifting table lies at the same level as the top surface of the passage for a physically handicapped person in the floor body. Then, the wheelchair or the passenger on the lifting table is transferred to the passage for a physically handicapped person in the floor body. The wheelchair or the passenger can thus enter the airplane through the platform. Of course, performing an operation opposite to that described above allows the passenger to exit the airplane.

When the crew member directs boarding in the section such as the floor body, the able-bodied person and the physically handicapped person can simultaneously step or move onto the medium-sized airplane. The able-bodied person and the physically handicapped person can also simultaneously exit the medium-sized airplane. For example, while the plurality of wheelchairs (or the single wheelchair) having passed through the platform are waiting on the passage for a physically handicapped person to exit the airplane, the able-bodied person can exit the airplane utilizing the passage for an able-bodied person.

For example, for entry to or exit from the small-sized airplane, the vehicle body is allowed to travel closer to the fuselage of the small-sized airplane. The lifting floor device has been driven by the lifting drive device to lower the floor body to place the stairway device horizontally. The vehicle body is stopped with the floor body located close to the platform. The fuselage door is then opened to open the platform. Thus, the able-bodied person can walk along the stairway section, the floor section, the horizontally placed stairway device, and the floor body and then enter the airplane through the platform. Additionally, the able-bodied person can exit the airplane by walking in the opposite direction. Furthermore, if a passenger is the physically handicapped person who requires the wheelchair or has difficulty stepping upstairs and downstairs, then as is the case with the medium-sized airplane, the wheelchair is moved from the ground surface onto the lifting table. The lifting table is then lifted and connected to the rear end of the passage for a physically handicapped person. Then, the wheelchair on the lifting table is transferred to the passage for a physically handicapped person in the floor body. The wheelchair can thus enter the airplane. Of course, moving the wheelchair in the opposite direction allows the physically handicapped person to exit the airplane.

When the crew member directs boarding in the section such as the floor body, the able-bodied person and the physically handicapped person can simultaneously step or move onto the small-sized airplane. The able-bodied person and the physically handicapped person can also simultaneously exit the small-sized airplane. For example, while the plurality of wheelchairs (or the single wheelchair) having passed through the platform are waiting on the passage for a physically handicapped person to exit the airplane, the able-bodied person can exit the airplane utilizing the passage for an able-bodied person.

Furthermore, the stairway device has the movable members provided at the respective sides thereof which are controllably placed upright and over sideways. The movable members are adapted so that when the floor body is lowered to place the stairway horizontally to bring the movable members over sideways, the upward surface of the movable members forms the passage for an able-bodied person and so that when the floor body is lifted to tilt the stairway with the stair tread group placed horizontally to bring the movable members upright, the movable members form the side covers.

With this configuration, for walk along the passage for an able-bodied person for entry to or exit from the medium-sized airplane, the movable members are placed upright to form the side covers to allow the walking able-bodied person to be prevented from, for example, falling sideways. Furthermore, for walk along the passage for an able-bodied person for entry to or exit from the small-sized airplane, the movable members are placed over sideways to form the upward surface, on which the able-bodied person can walk.

Moreover, the lifting table device has the lifting drive section provided at the rear end of the vehicle body, and the lifting table lifted and lowered by the lifting drive section. The lifting table has the side covers provided at the respective sides thereof and the openable and closable doors provided at the front and rear thereof, respectively.

With this configuration, opening the rear door allows the wheelchair to be moved between the ground and the lifting table. Furthermore, opening the front door allows the wheelchair to be moved between the passage for a physically handicapped person in the floor body and the lifting table. After the front and rear doors are closed, the lifting drive section drivingly lifts and lowers the lifting table to enable the wheelchair on the lifting table to be lifted and lowered with the wheelchair surrounded by the front and rear doors and the side covers.

Second Embodiment

Now, a vehicle for passenger entry and exit according to Embodiment 2 of the present invention will be described with reference to FIGS. 13 to 27.

In the vehicle for passenger entry and exit according to Embodiment 1 described above, the passage for an able-bodied person is located at the left of the vehicle. The passage for a physically handicapped person is located at the right of the vehicle. The section for entry to and exit from the airplane is located in the central portion between the two passages. However, in the vehicle for passenger entry and exit according to Embodiment 2, a passage for an able-bodied person is located at the right of the vehicle. A passage for a physically handicapped person is located at the left of the vehicle. A section for entry to and exit from the airplane is located on the side of the passage for an able-bodied person. Embodiment 2 has almost the same configuration as that described in Embodiment 1. Thus, the configuration according to Embodiment 2 will be described in brief, and for the details, the description of Embodiment 1 will be referenced.

That is, as shown in FIGS. 13 to 17, a vehicle for passenger entry and exit 111 according to Embodiment 2 roughly comprises a vehicle body 113 having a traveling device 112 so as to travel controllably on a ground 101, a lifting floor device 115 which is provided in the vehicle body 113 and can be lifted and lowered via a lifting drive device 114 to allow passengers to enter and exit the airplane, a stairway device 116 coupled to the lifting floor device 115, and a lifting table device 117 for a physically handicapped person placed at the rear of the vehicle body 113.

A hydraulic drive system driven by an engine or electricity from batteries is used as power for the vehicle for passenger entry and exit 111. The hydraulic drive system has a high pressure-side hydraulic pump and a low pressure-side hydraulic pump. For example, oil pressure from the high pressure-side hydraulic pump is used as a traveling drive source for the vehicle body 113. Oil pressure from the low pressure-side hydraulic pump is used for hydraulic cylinders provided in the other drive sections. A hydraulic unit having a hydraulic pump driven by the electricity from the batteries (of course, an electric motor) is used as a drive source for the lifting table device 117.

The vehicle body 113 is composed of a frame 121 which is long in a front-to-back direction and which appears to be rectangular in a plan view, and an operation room 122 provided at the left of the frame 121.

The traveling device 112 is composed of wheels 123 arranged at the right and left of the frame 121 in each of the front and rear of the frame, a hydraulic motor (not shown) that directly drives, for example, the front wheels 123, a steering device 125 operated with a handle 124 located in the operation room 122, provided at the front of the vehicle body 113, and a hydraulic drive system (not shown) driven by the engine as described above. The steering device 125 is composed of direction changing levers 126, a direction changing hydraulic cylinder 127 that causes the direction changing lever 126 to pivot, and a synchronizing link 128 that couples the right and left direction changing levers 126 together.

Outriggers 129 are provided at the right and left of the frame 121 of the vehicle body 113 in each of the front and rear of the frame 121 to supportively fix (position) the vehicle body 113 on the ground.

The lifting floor device 115 is composed of a first passage body (also referred to as a main passage body or a rear passage body) 131 having a rectangular cross section and which is located on the vehicle body 113, at the right of the operation room 122 so as to be controllably lifted and lowered via the lifting drive device 114, a second passage body (also referred to as a sub-passage body or a front passage body) 132 having a rectangular cross section and which is internally fitted into the first passage body 131 so as to be controllably extended from and retracted to the first passage body 131 in the front-to-back direction, and an extending and retracting hydraulic cylinder (an example of an extending and retracting device) 133 mounted across both passage bodies 131 and 132 to extend and retract the second passage body 132 from and to the first passage body 131.

The first passage body 131 is composed of a first floor body (also referred to as a lifting floor) 134 which is long in the front-to-back direction and which has a cutout 134a formed at the right of the first floor body, at the rear thereof, and a first cover body 135 provided upright in the upper part of the first passage body 131 and having an inverse U-shaped cross section.

The second passage body 132 is composed of a second floor body (also referred to as a moving floor) 136 which is long in the front-to-back direction and which has a rear cutout 136a formed at the right of the second floor body 136, at the rear thereof and appearing to be rectangular in a plan view and a front cutout 136b formed at the right of the second floor body 136, at the front thereof and appearing to be rectangular in a plan view, and a second cover body 137 provided upright so as to cover the entire surface of the second floor body 136 and having an inverse U-shaped cross section.

Guide rollers 138 are provided at the rear end of the second passage body 132, at the top and bottom thereof, respectively, and can roll in contact with a component (shape steel or the like) 131a of the first passage body 131. A support roller 139 is provided at the front end of the first passage body 131 and can support a component (shape steel or the like) 132a in the lower part of the second passage body 132. Although not shown in the drawings, a guide roller for guidance in a lateral direction is provided together with each of the guide rollers 138. Furthermore, in order to cushion contact with the fuselage, a rubber cushioning material 140 having a U-shaped (or D-shaped) cross section is attached to the tip of the second floor body 136 so as to extend in the width direction of the second floor body 136.

Figure 18:
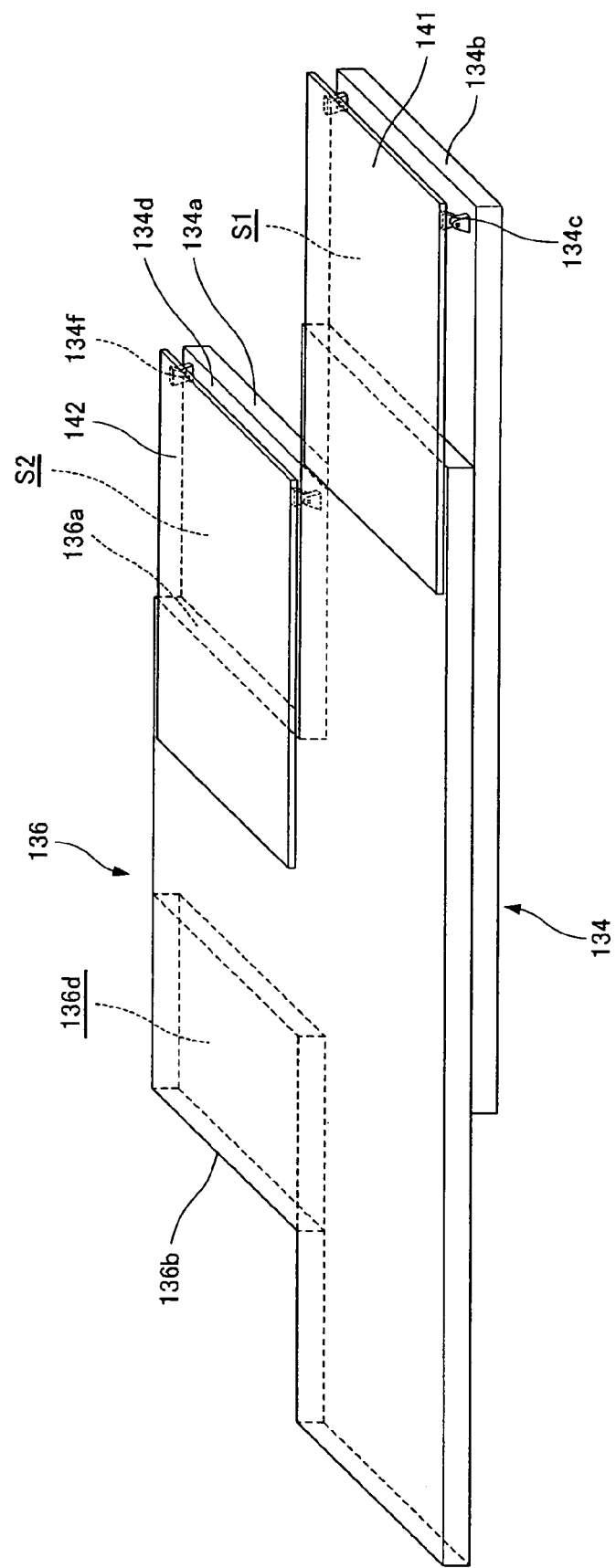
FIG. 18 is a perspective view showing the general configuration of a floor body of the vehicle for passenger entry and exit.

As shown in FIG. 18, the second floor body 136 of the second passage body 132 has a certain thickness (corresponding to the height of the shape steel constituting the floor body). When the second floor body 136 moves with respect to the first passage body 131, a step section correspondingly moves, posing a danger to walking passengers. Thus, slidable floor plates 141 and 142 are arranged at the left of the second floor body 136, at the rear thereof and at the right of the second floor body 136, at the rear thereof (at the right thereof, in the intermediate part thereof), respectively, so as to always cover, from above, a left recess section S1 and a right recess section S2 created by the step section.

Specifically, the rear end of the slidable floor plate 141, located at the left of the second floor body 136, at the rear thereof, is supported at an end of a peripheral component 134b of the first floor body 134 via mounting shafts 134c. The front end of the slidable floor plate 141 is slidably placed on the second floor body 136 (for example, one of the slidable floor plate 141 and the second floor body 136 is composed of a material that slides easily with respect to the other). Similarly, the rear end of the slidable floor plate 142, located at the right of the second floor body 136, at the rear thereof (the rear of the cutout 136a), is attached to a component 134d of the first floor body 134 located in front of the cutout 134a. The front end of the slidable floor plate 142 is slidably placed on the second floor body 136 (for example, one of the slidable floor plate 142 and the second floor body 136 is composed of a material that slides easily with respect to the other). Although not shown in the drawings, a protruding section is provided on the bottom surface of the tip of each of the slidable floor plates 141 and 142. A recess section through which the protruding section is guided is formed in the second floor body 136. Furthermore, a handrail 136c is provided at a side edge of the second floor body 136 corresponding to the rear cutout 136a. The handrail 136c is provided across the first floor body 134 and the second floor body 136. As a matter of course, a horizontal part of the handrail 136c has an expandable double pipe structure.

Furthermore, a movable floor body 143 that can be placed upright and over sideways (the movable floor body 143 may also be referred to as a pivotable or tiltable type) is provided at the front cutout 136b in the second floor body 136. That is, the movable floor body 143 is attached to a side edge of the front cutout 136b via a hinge. A handrail 144 is provided at the left edge of the movable floor body 143. The movable floor body 143 is raised and laid down in the lateral direction.

Figure 16:
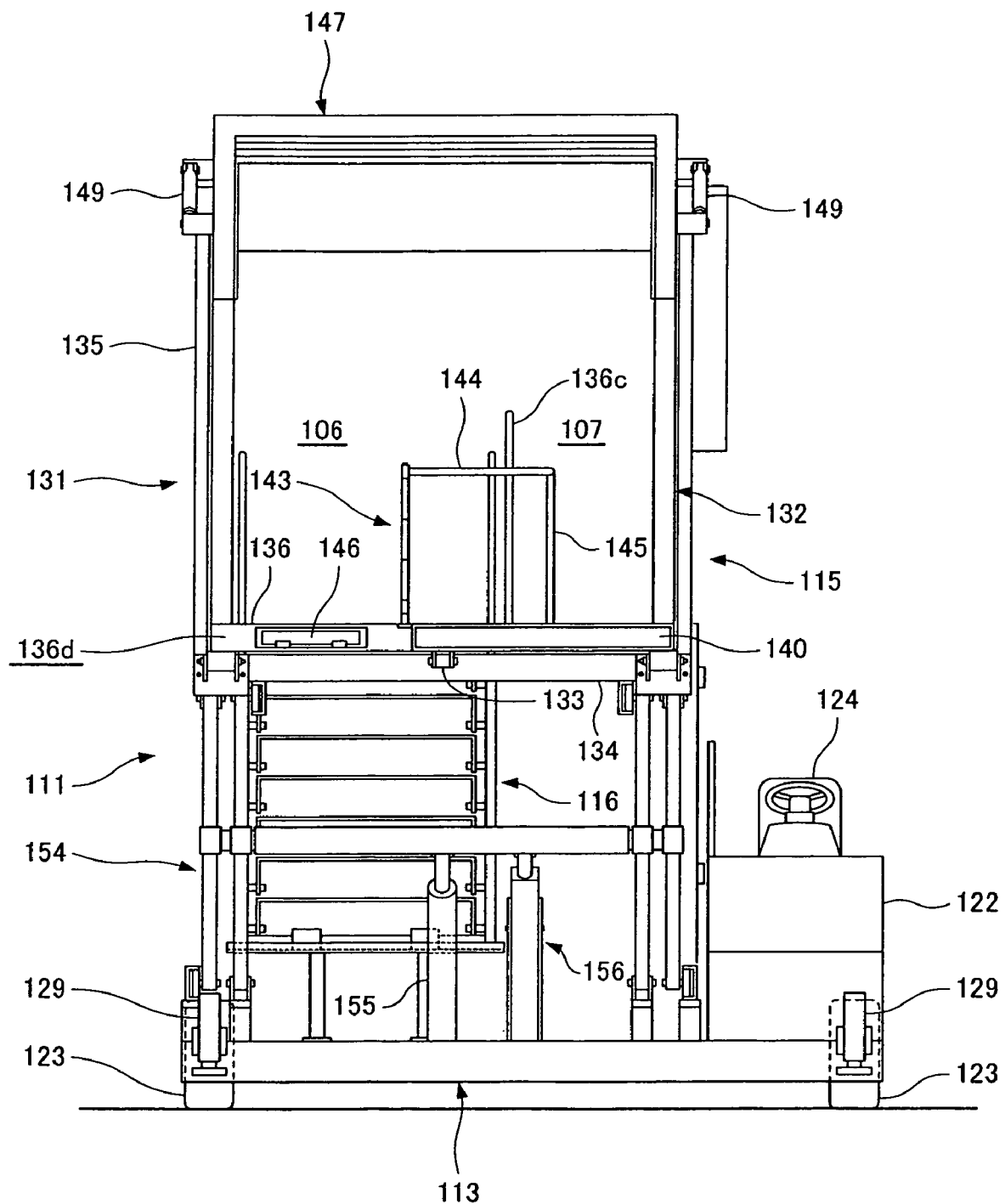
FIG. 16 is a front view of the vehicle for passenger entry and exit.
Figure 17:
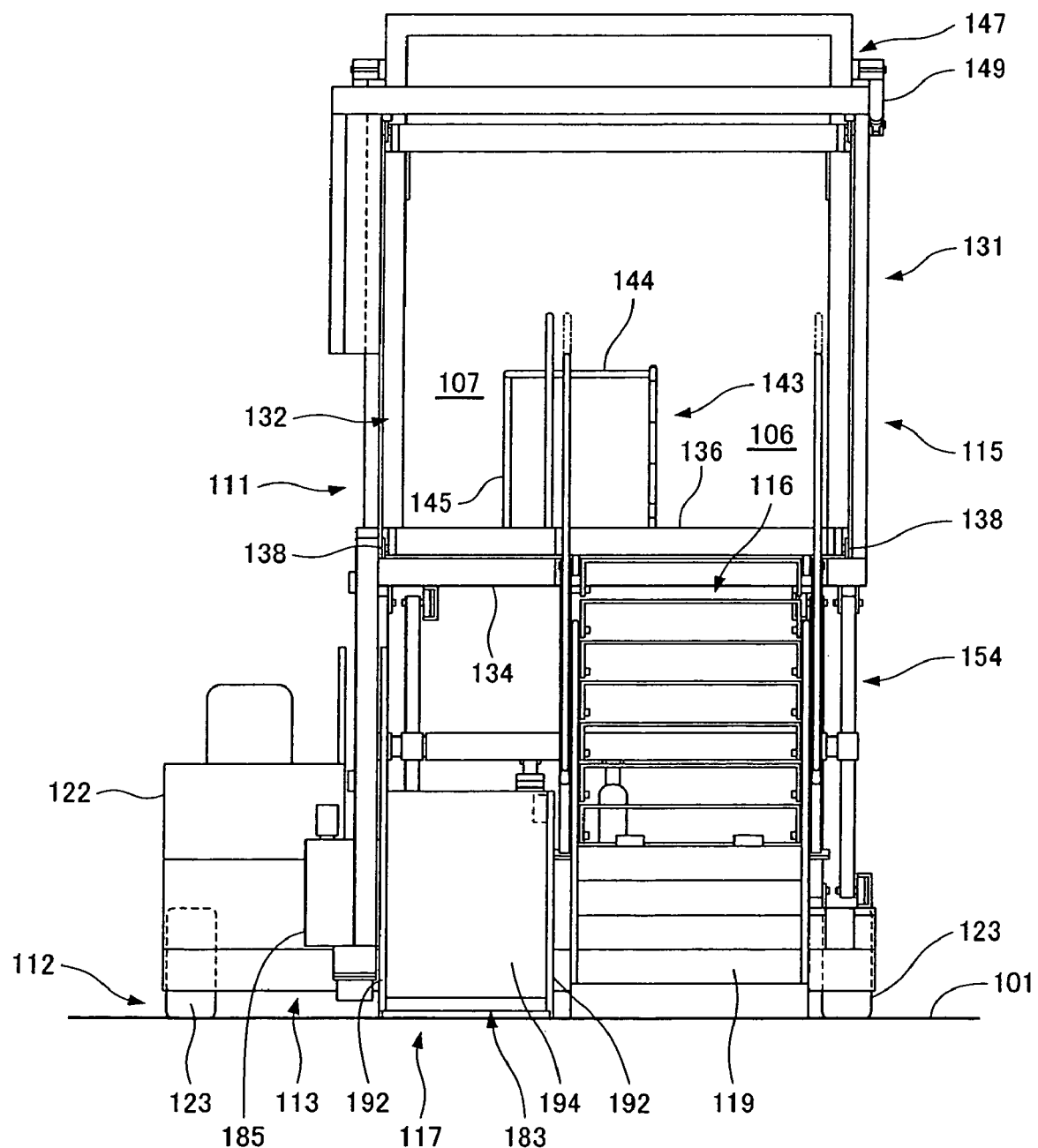
FIG. 17 is a rear view of the vehicle for passenger entry and exit.

A positioning rod 145 hangs pivotably from a top horizontal part of the handrail 144. When the movable floor body 143 is laid down and used as a floor surface, the tip of the rod 145 is fixed to the movable floor body 143 side to constitute a part of the handrail. When the movable floor body 143 is raised to avoid being used as the floor surface, the tip of the rod 145 is fixed to the second floor body 136 side to provide a function of fixing the movable floor body 143 and a function of inhibiting passengers from approaching the movable floor body 143 through the left passage as shown in FIG. 16.

A housing space section 136d is formed at the right of the second floor body 136, at the front of the second floor body (at the end of the second floor body 136 corresponding to the front cutout 136b) so as to extend in the front-to-back direction. A bridge plate 146 for connection to the platform of the airplane is housed in the housing space section 136d via a guide rail and the like.

The front cutout 136b is formed in the second floor body 136 in order to avoid using a stairway installed on a fuselage door of a small-sized airplane when the fuselage door is opened. Consequently, for the small-sized airplane, first, the vehicle for passenger entry and exit may be operated to approach the airplane with the movable floor body 143 raised. Then, the bridge plate 146 may be drawn out of the housing space section 136d, and the front end of the bridge plate 146 may be placed on the platform of the airplane. For the medium-sized airplane, the movable floor plate 143 is laid down horizontally for use.

Furthermore, the front of the second cover body 137 of the second passage body 132 is formed to be slightly higher than the remaining part thereof. At the front of the second cover body 137, a bellows-type hood body (which is also a top body) 147 is pivotably supported at the front end of the second cover body 137 via a support shaft 148 in order to prevent passengers from being exposed to wind or rain while transferring to the airplane. The hood body 147 is also pivotable forward by means of a pivoting hydraulic cylinder (an example of a pivoting device) 149 supported on the second passage body 132 side. The front of the second cover body 137 is formed to be higher in order to deal with the large (even the slightly large) fuselage of the airplane without sharply increasing the sizes of the passage bodies 131 and 132.

The hood body 147 is composed of a pivoting member (a part of the pivoting member which contacts the fuselage has an elastic material such as rubber) 147a supported via the support shaft 148, and a top section 147b. Consequently, when passengers enter or exit the airplane, the pivoting member 147a at the front end of the hood body 147 is contacted with (installed on) a part of the fuselage of the airplane which is located above the platform.

The right passage of the first floor plate 134 and the stairway device 116 constitute a passage 106 for an able-bodied person. Thus, the left passage of the first floor plate 134 constitutes a passage 107 for a physically handicapped person. Furthermore, the length of the rear cutout 134a, in which the stairway device 116 is placed, is, for example, about two-thirds of the length of the first floor body 134 as described in Embodiment 1. Thus, about one-third forward part of the first floor body 134 in both the right and left passages and the second floor plate 136 constitute a common passage.

As shown in FIGS. 19 to 22, the lifting drive device 114 is composed of a pantograph-type link support body 154 located between the vehicle body 113 and the first floor body 134 of the first passage body 131 and having an inner link member 151 and an outer link member 152 coupled together like the letter X via a coupling shaft 153 extending in a horizontal direction, an expanding hydraulic cylinder (an example of an expanding device) 155 that expands and contracts the link support body 154 in the vertical direction, and a stopper body 156 that maintains the position of the expanded or contracted link support body 154.

Specifically, the inner link member 151 is composed of a lateral pair of links 151a, 151a and a coupling material 151b that couples the right and left links 151a, 151a together. The outer link member 152 is composed of a lateral pair of links 152a. The right links 151a and 152a, located adjacent to each other, are coupled together by a coupling shaft 153. The left links 151a and 152a, located adjacent to each other, are also coupled together by the coupling shaft 153.

Figure 19:
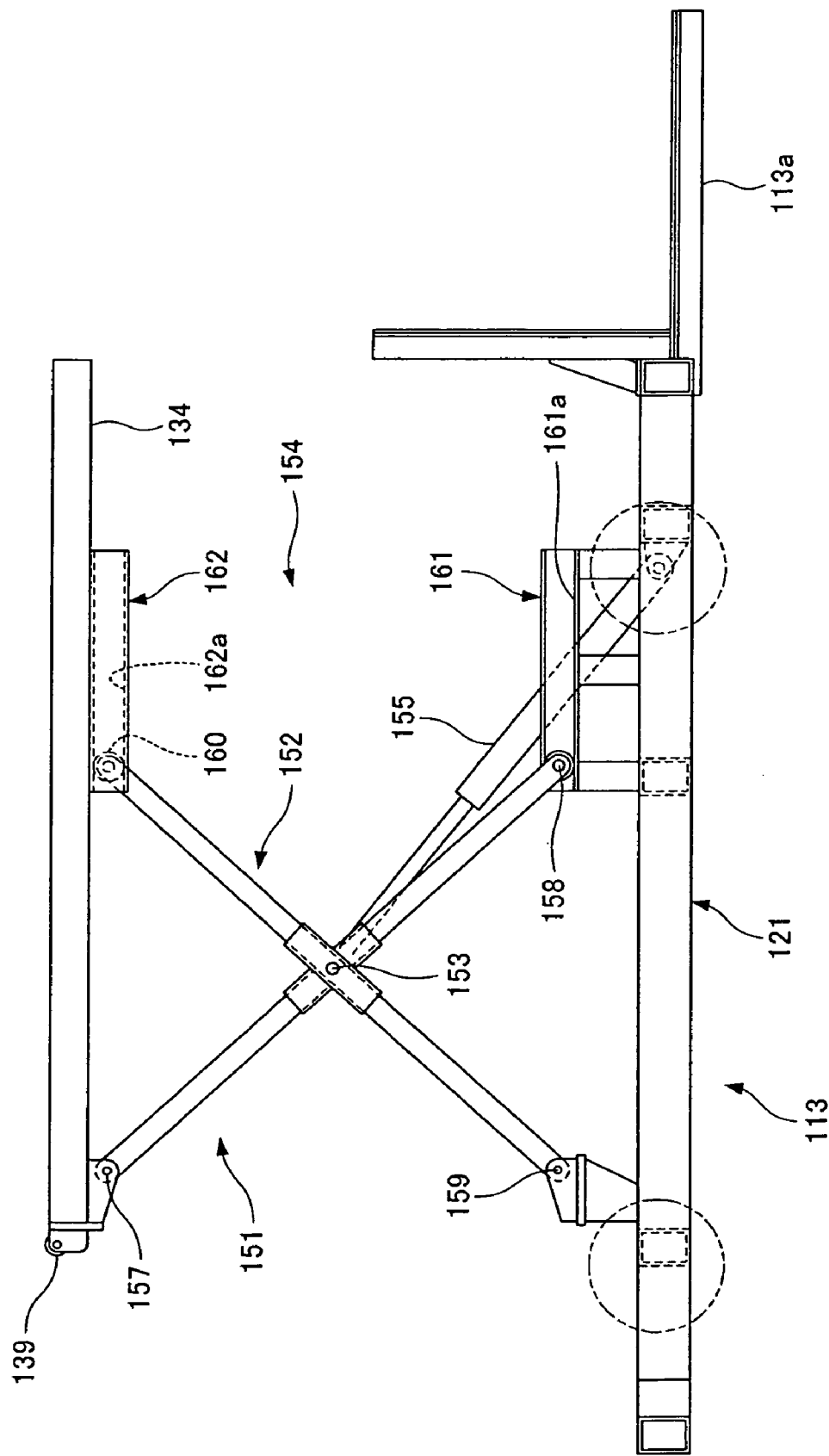
FIG. 19 is a side view showing the general configuration of a lifting drive device of the vehicle for passenger entry and exit.

The upper end of one of the link members, in this case, the inner link member 151, is coupled to the first floor body 134 of the first passage body 131 by a coupling shaft 157 extending in the horizontal direction. A guide roller 158 provided at the lower end of the inner link member 151 is horizontally rollably located in a groove section 161a of a guide member 161 provided on the vehicle body 113 side. Furthermore, the lower end of the outer link member 152 is coupled to the vehicle body 113 via a coupling shaft 159. A guide roller 160 provided at the upper end of the outer link member 152 is rollably located in a groove section 162a of a guide member 162 provided on the first floor body 134 side of the first passage body 131. In FIG. 19, a stopper body 156 is omitted.

Figure 20:
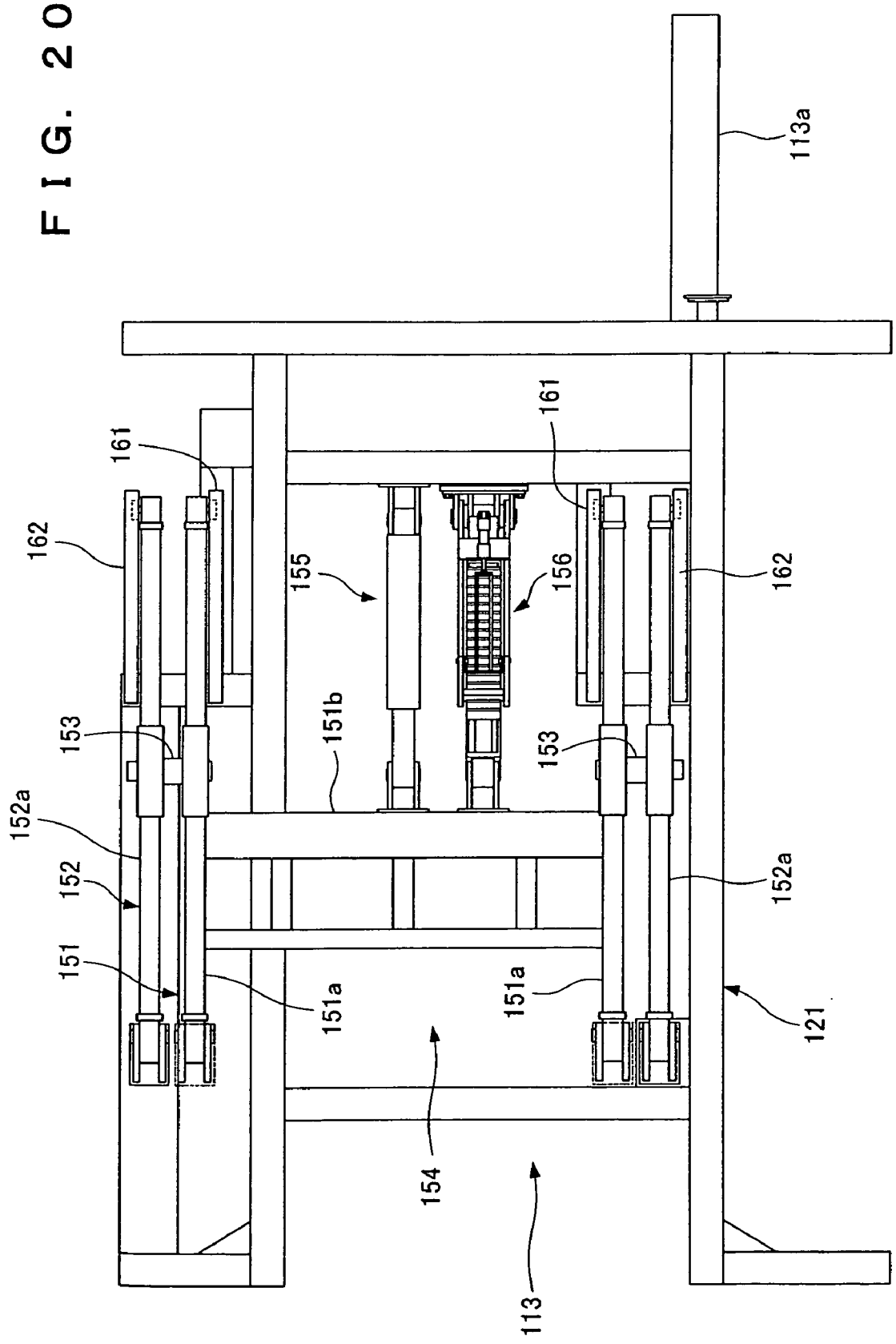
FIG. 20 is a plan view showing the general configuration of the lifting drive device of the vehicle for passenger entry and exit.
Figure 21:
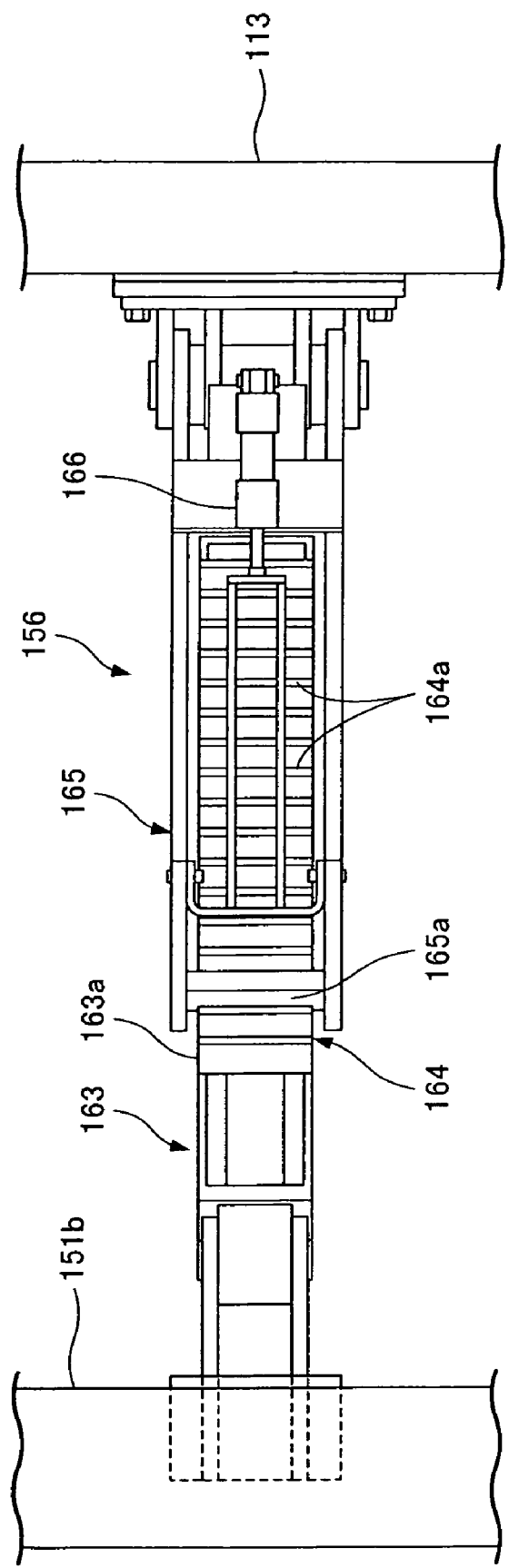
FIG. 21 is a plan view showing the configuration of an essential part of the lifting drive device of the vehicle for passenger entry and exit.
Figure 22:
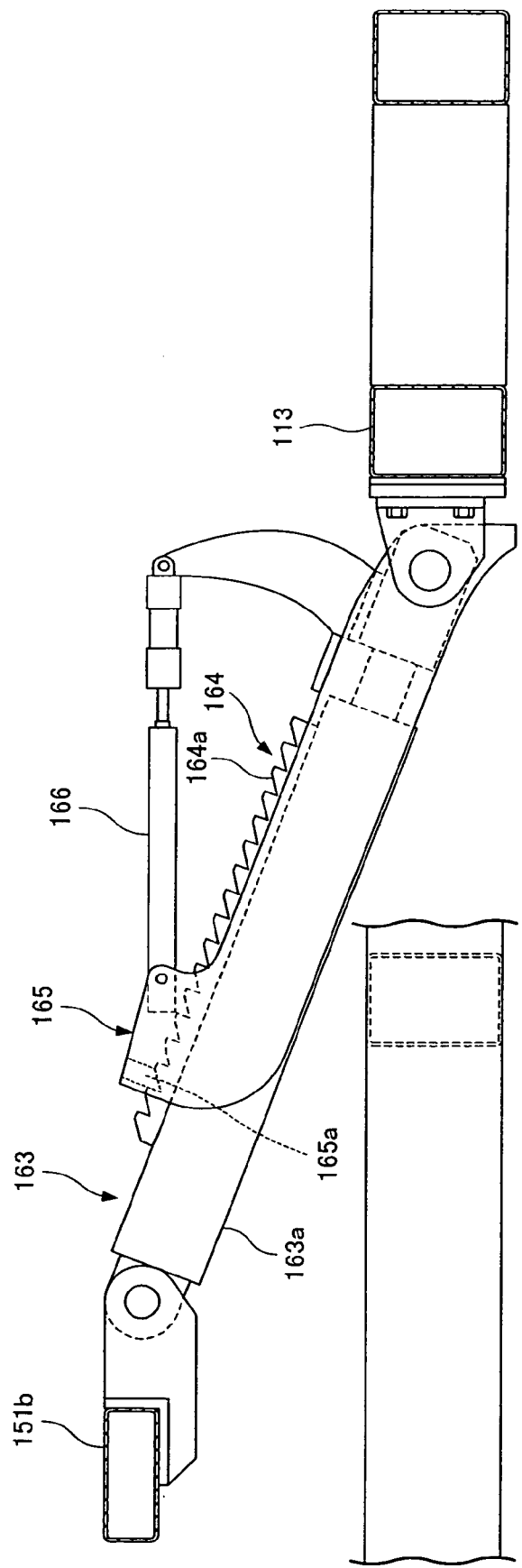
FIG. 22 is a side view showing the configuration of the essential part of the lifting drive device of the vehicle for passenger entry and exit.

As shown in FIGS. 20 to 22, the stopper body 156 is composed of a hydraulic cylinder 163 as an expanding body which is located parallel to the expanding hydraulic cylinder 155, a ratchet member 164 located on the top surface of a cylinder body 163a of the hydraulic cylinder 163 and in the axial direction, a locking member 165 having a claw 165a that can mesh with ratchet teeth 164a provided on the ratchet member 164, and a pivoting hydraulic cylinder (an example of a pivoting device) 166 that causes the locking member 165 to pivot to allow the claw 165a to be disengaged from the ratchet teeth 164a. Of course, the hydraulic cylinder 163 is attached to between the vehicle body 113 and the coupling material 151b of the inner link member 151.

With this configuration, when the claw 165a is engaged with the ratchet teeth 164a to place the locking member 165 in a locking posture, the expanding hydraulic cylinder 155 is expanded to extend the link support body 154 upward to move and sequentially engage the claw 165a with the ratchet teeth 164a. The upper end of the link support body 154 is then lifted and the position of the lifted upper end is maintained.

Conversely, to contract the link support body 154, first, the expanding hydraulic cylinder 155 may be slightly expanded to disengage the claw 165a from the ratchet teeth 164a. Then, the pivoting hydraulic cylinder 166 may be driven to cause the locking member 165 to pivot upward to place the locking member 165 in a cleared posture. The expanding hydraulic cylinder 155 may then be contracted.

The hydraulic cylinder 163 is used as the expanding body for the stopper body 156. However, the hydraulic cylinder 163 is used only as a member that expands and contracts. Thus, the hydraulic cylinder 163 need not provide the inherent function thereof (that is, a function of generating an actuating force). No oil pressure is supplied to the hydraulic cylinder 163, and an amount of oil only sufficient to serve as a lubricant may be provided in the hydraulic cylinder 163. Furthermore, the hydraulic cylinder 163 is attached in a direction opposite to that in which the expanding hydraulic cylinder 155 is attached. This is to allow the ratchet member 164 to be located on the cylinder body 163a side.

For example, an alternative to the hydraulic cylinder 163 may be composed of an outer cylinder coupled to the coupling material 151b of the inner link member 151 and an inner cylinder internally fitted into the outer cylinder so as to be able to be extended from and retracted to the outer cylinder and the tip of which is coupled to the vehicle body 113 side. In this case, the ratchet member is provided on the outer cylinder side.

Figure 23:
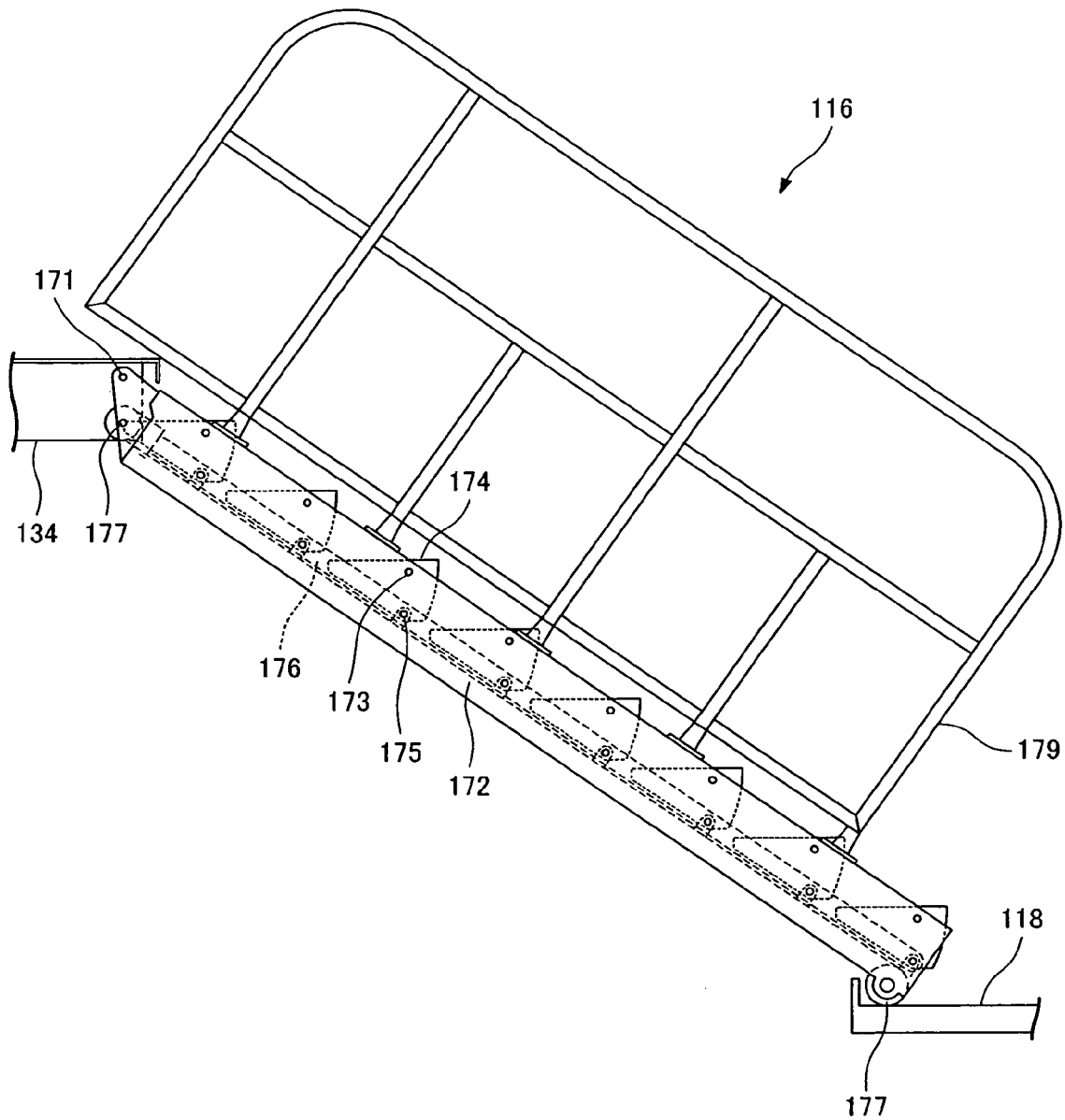
FIG. 23 is a side view of a stairway device of the vehicle for passenger entry and exit.
Figure 24:
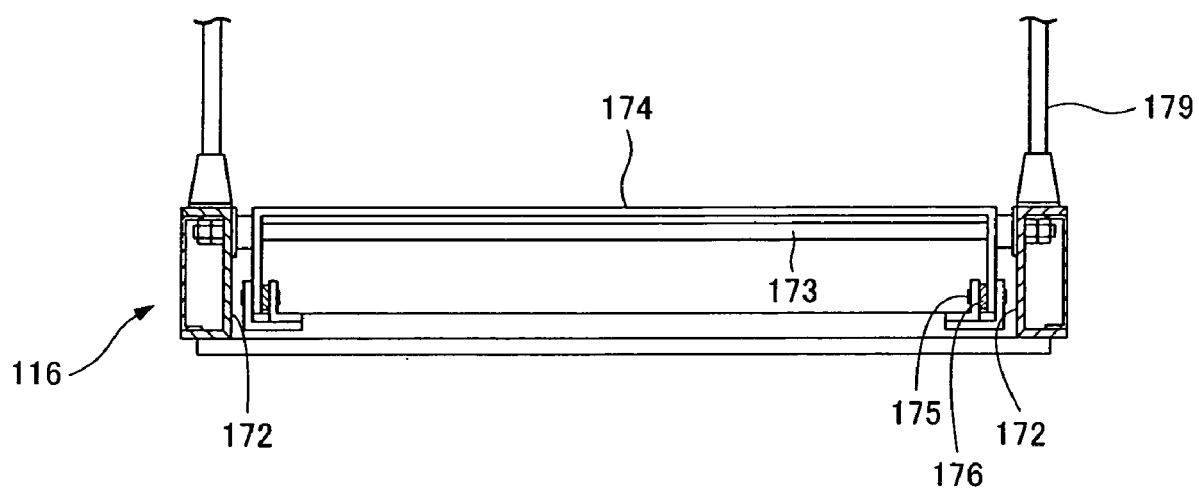
FIG. 24 is a cross sectional view of the stairway device of the vehicle for passenger entry and exit.
Figure 25:
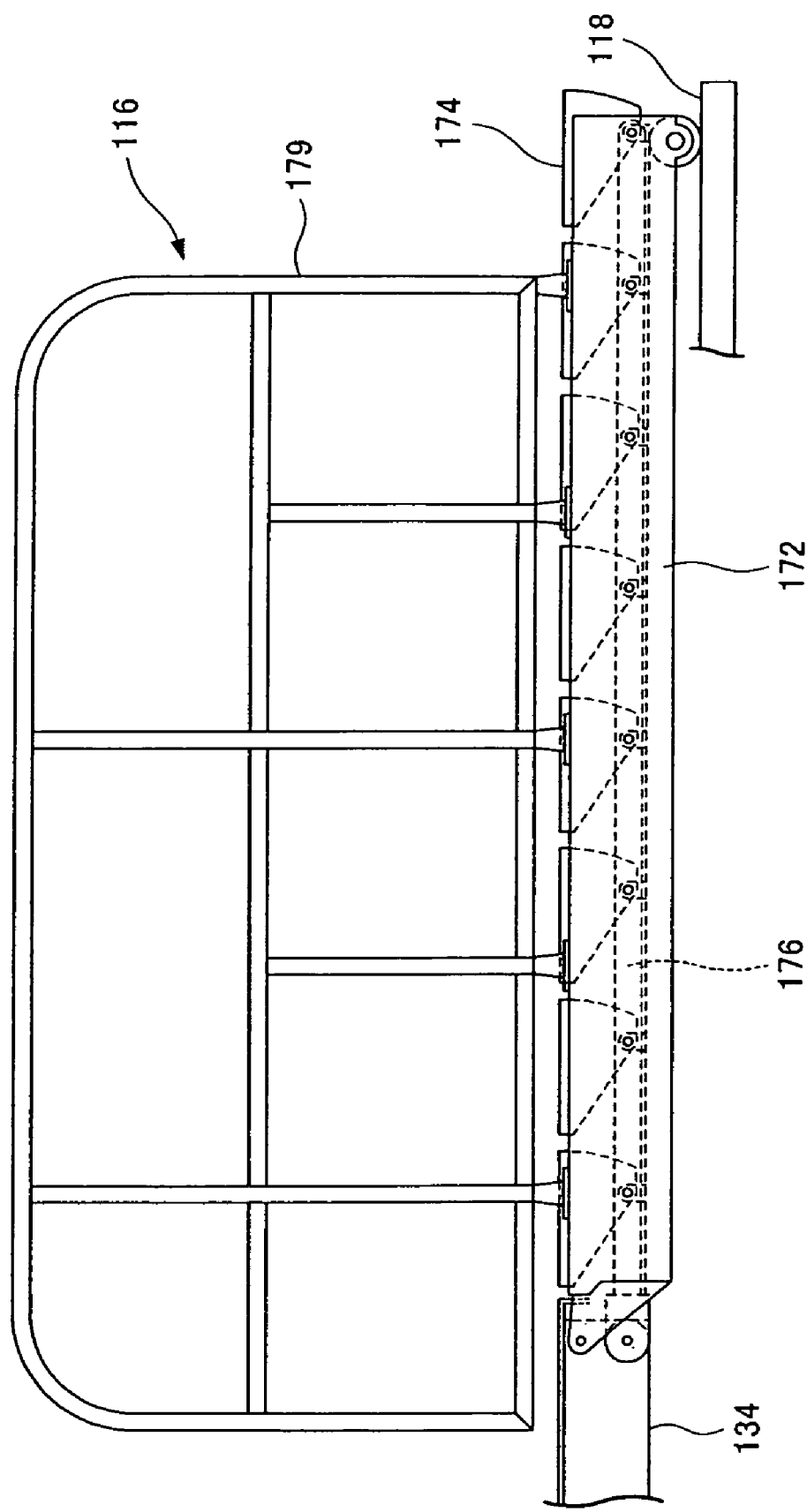
FIG. 25 is a side view of the stairway device of the vehicle for passenger entry and exit.

As shown in FIGS. 23 to 25, the stairway device 116 connects the passage floor surface of the lifting floor device 115 to a floor section 118 located behind the vehicle body 113 when the lifting floor device 115 is lifted. As a matter of course, the stairway device 116 pivots (tilts) in a vertical plane in response to lifting and lowering of the lifting floor device 115. However, the stairway of the stairway device can be used, whatever posture the stairway device takes.

That is, the stairway device 116 is composed of a lateral pair of side plates 172 each having a front end pivotably attached to the first floor body 134 of the first passage body 131 via a horizontal mounting shaft 171, a plurality of stair treads 174 arranged between the opposite side plates 172 and each supported at the predetermined position thereof (for example, the upper position thereof) via a horizontal support shaft 173 so as to be pivotable in a vertical plane, and a link member 176 coupled via a horizontal coupling shaft 175 to a position (for example, a lower position) of each of the stair treads 174 which is different from that of the support shaft 173, the link member 176 forming a parallel link mechanism together with the side plates 172 and the stair treads 174. The front end of the link member 176 is coupled to the first floor body 134 side via a horizontal mounting shaft 177. Furthermore, a guide roller 178 that is rollable on the top surface of the vehicle body 113 is provided at the rear end (lower end) of each of the side plates 172. Additionally, a handrail 179 is provided on the top surface of each of the side plates 172.

In this manner, the side plates 172, the link member 176, and the stair treads 174 constitute the parallel link mechanism. Thus, even if the stairway device 116 is tilted, each of the stair treads 174 can maintain a horizontal posture. This allows passengers to step upstairs and downstairs without any problem. When the first passage body 131 is located at the lowest position, the stairway device 116 is in a horizontal condition. However, even in this case, all the stair treads 174, of course, take the horizontal posture, forming a floor surface as shown in FIG. 25.

Figure 13:
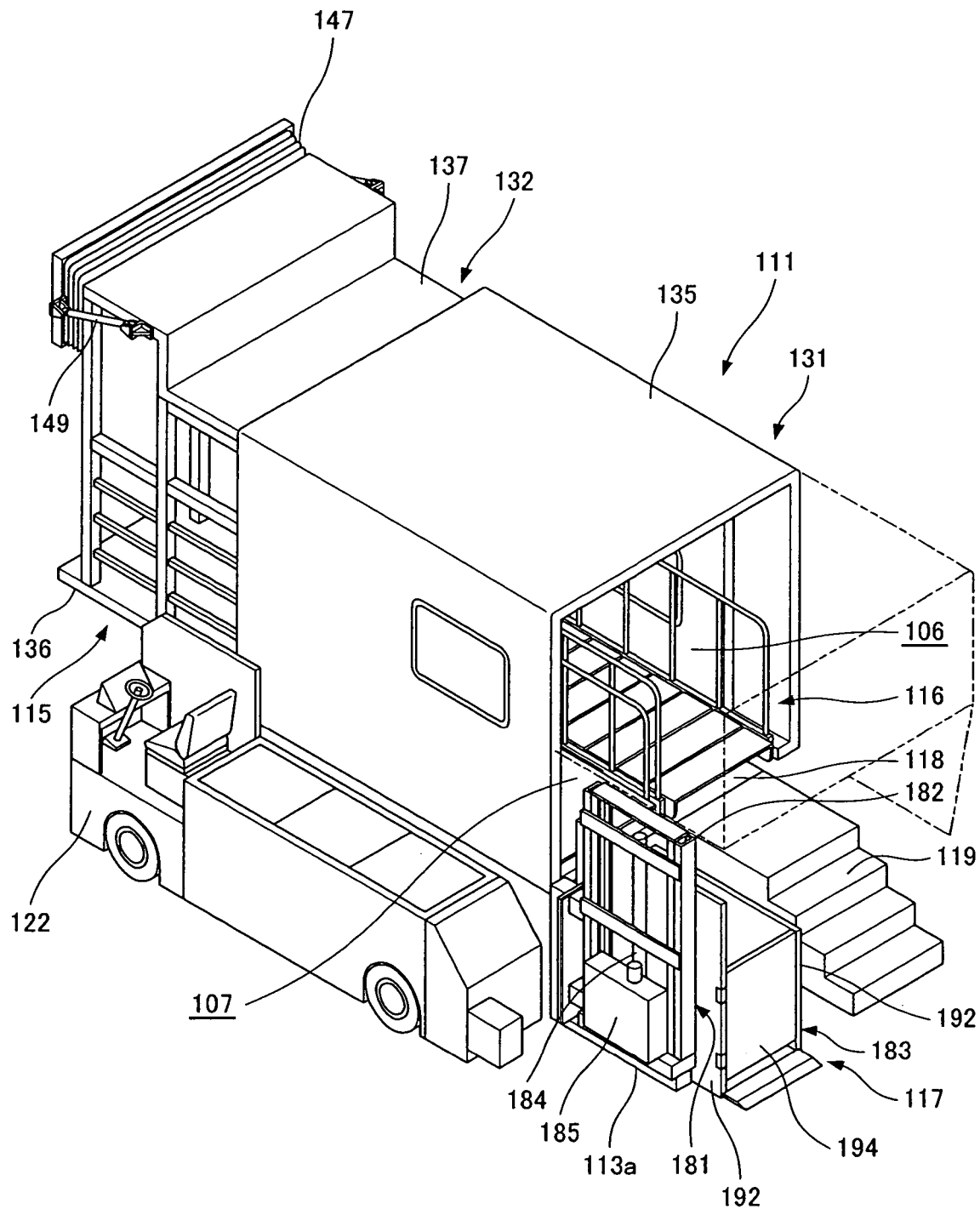
FIG. 13 is a perspective view of a vehicle for passenger entry and exit according to Embodiment 2 of the present invention.
Figure 14:
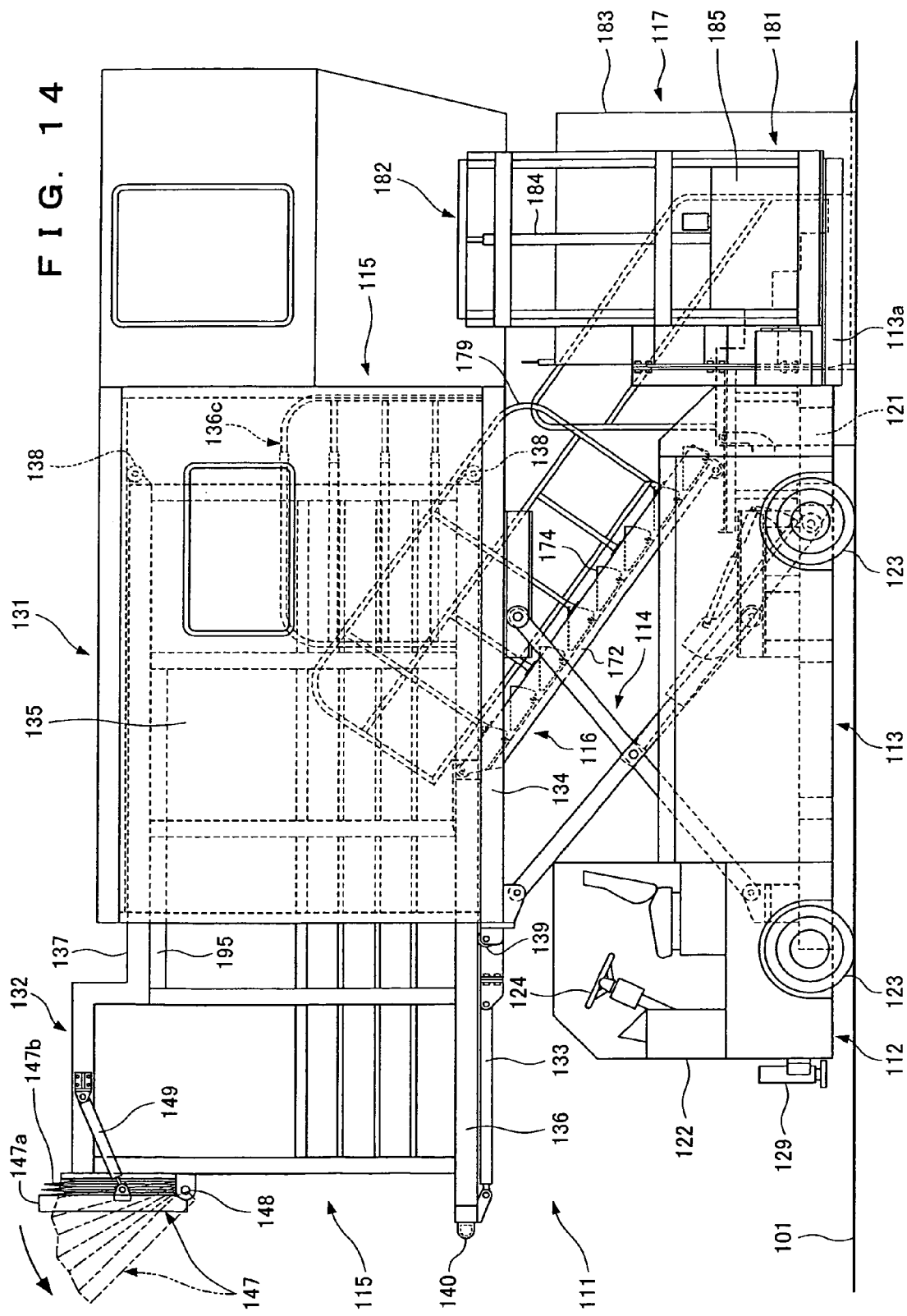
FIG. 14 is a side view of the vehicle for passenger entry and exit.
Figure 15:
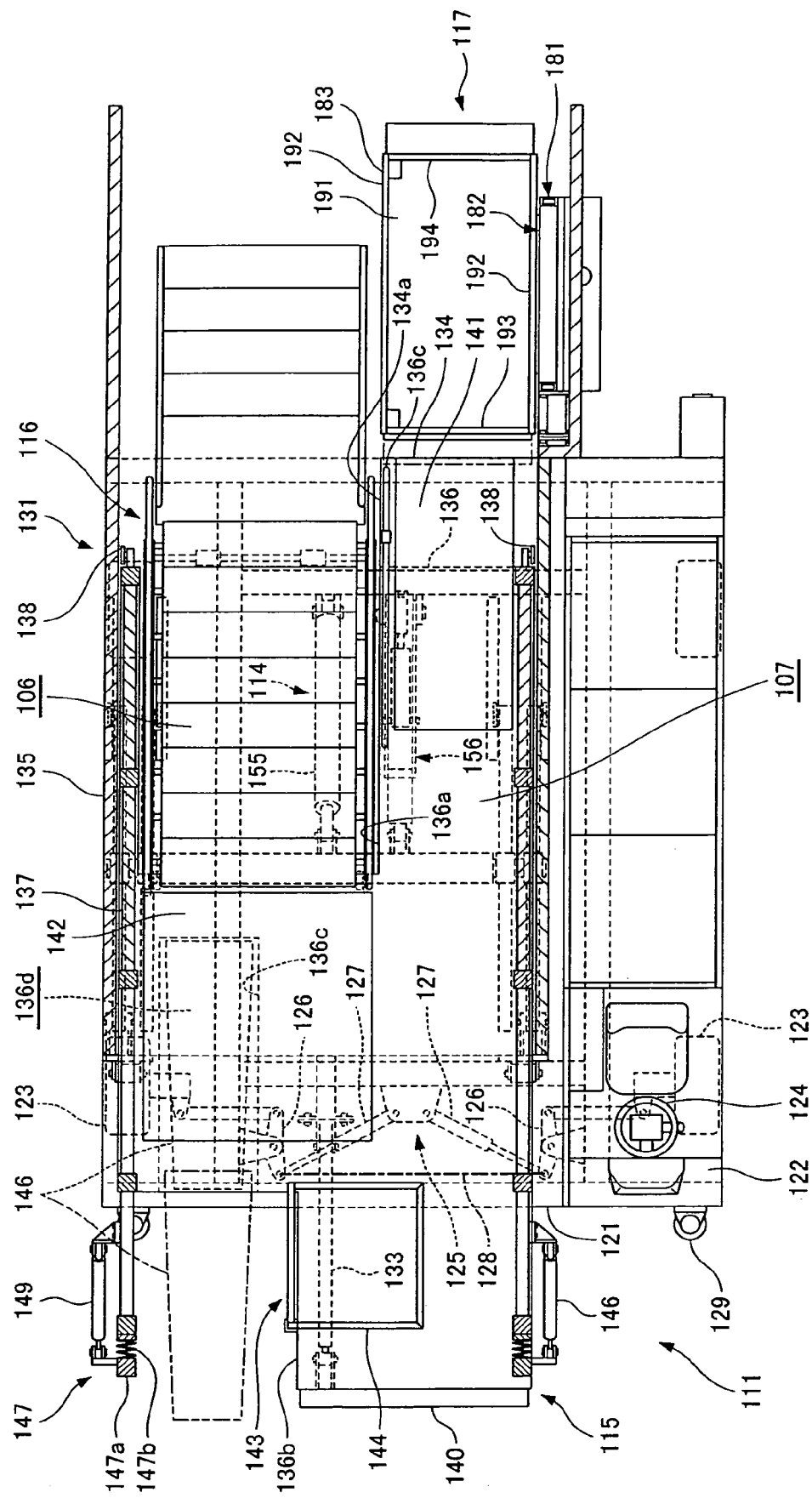
FIG. 15 is a partly cutaway plan view of the vehicle for passenger entry and exit.

As shown in FIGS. 13 to 15, the lifting table device 117 is composed of a guide member 181 provided upright on a support member 113a projecting in the horizontal direction from the rear of the vehicle body 113, a lifting member 182 guided by the guide member 181 so as to be able to be lifted and lowered, a lifting table 183 guided by the lifting member 182 so as to be able to be lifted and lowered, a chain (not shown) having a first end coupled to the guide member 181 side, an intermediate part wound around a sprocket (not shown) rotatably provided in the lifting member 182, and a second end coupled to the lifting table 183, a lifting hydraulic cylinder (an example of a lifting device) 184 provided in the guide member 181 to lift and lower the lifting member 182, and a hydraulic unit 185 that supplies oil pressure to the lifting hydraulic cylinder 184. The specific configurations of the guide member 181, the lifting member 182, and the like are the same as those described in Embodiment 1 (for example, the structure made up of the outer mast, the inner mast, and the like). For the same reason, the sprocket and the chain are not shown in the drawings.

The lifting table 183 is composed of a floor plate 191 that appears to be rectangular in a plan view, side plates (an example of a side wall member) 192 provided upright at the right and left of the floor plate 191, and a front door 193 and a rear door 194 provided at the front and rear, respectively, of the floor plate 191.

Furthermore, the lifting table 183 has a lifting operation panel (not shown) that allows a lifting operation and a lowering operation to be performed on the lifting table 183 side.

The lifting table 183 has a limit switch (not shown) that stops the lifting or lowering operation of the lifting table 183 if a normal lifting or lowering range is exceeded. The lifting table 183 is interlocked such that the lifting and lowering operations of the lifting table 183 can be performed only when a stopper for fixing the closed condition of the doors 193 and 194 is active.

Moreover, a stairway section 119 is provided at the rear of the vehicle body 113, at the right thereof so that passengers can step up to the floor section 118 through the stairway section 119.

A floor operation panel (not shown) is provided at the front of the second passage body 132 to allow the lifting floor device 115 to be operated (of course, this operation can also be performed in the operation room). Furthermore, the front half of the second passage body 132 has only a framework structure such that the platform of the airplane can be seen from the operation room 122, located below the second passage body 132, at the left of the second passage body. The front half of the second passage body 132 also has a withdrawer-type shutter member 195 used in the case of a heavy rain or strong wind.

Moreover, although not shown in the drawings, laser emitters (also referred to as positioning devices) are provided at the opposite sides of the front end of the first passage body 131 to emit laser light at a predetermined height to determine the position of the first passage body with respect to the airplane.

Now, entry and exit using the vehicle for passenger entry and exit 111 will be described.

First, entry to and exit from a medium-sized airplane will be described.

Figure 26:
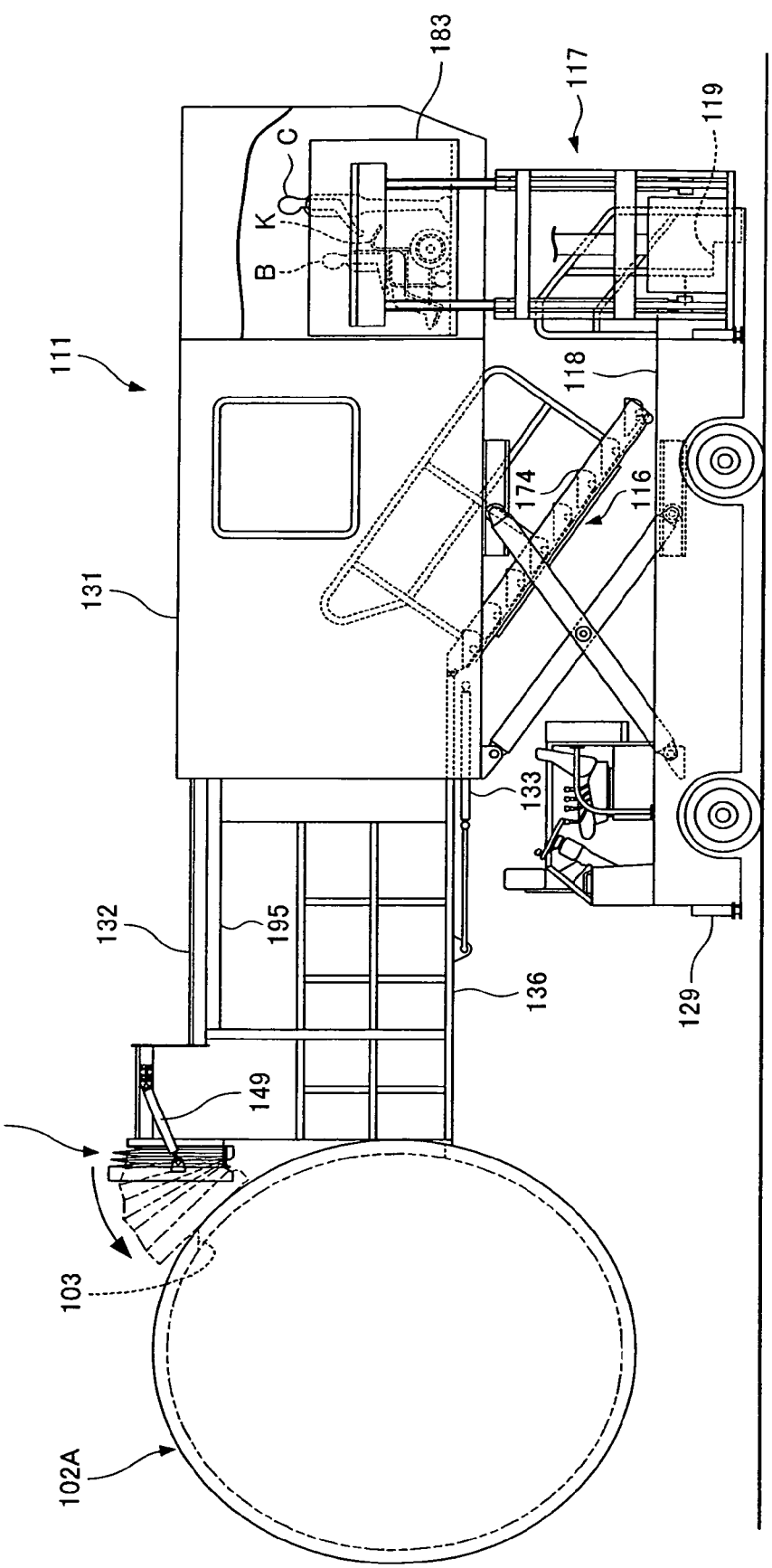
FIG. 26 is a side view showing how a passenger enters a medium-sized airplane using the vehicle for passenger entry and exit.

As shown in FIG. 26, a medium-sized airplane 102A has a high platform 103. The lifting floor device 115 is lifted on the basis of the position of the platform 103.

That is, the expanding hydraulic cylinder 155 is expanded to place both passage bodies 131 and 132 at a lifted position, with the lifting table 183 remaining at a lowered position (the lifting table 183 is lifted in the drawing). Of course, when both passage bodies 131 and 132 are located at the lifted position, the upper end of the stairway device 116 is located at the lifted position, whereas the lower end of the stairway device 116 is located on the floor section 118. Obviously, passengers can step upstairs and downstairs via the stair treads 174. Furthermore, if the weather is not bad, the shutter member 195 of the second passage body 132 is opened so that the vehicle for passenger entry and exit can be easily operated. The movable floor body 143 has been laid down for use.

In this condition, an operator allows the vehicle for passenger entry and exit 111 to travel to the vicinity of the medium-sized airplane 102A. The operator then uses laser light to align the vehicle body 113 with the platform 103 and then stops the vehicle for passenger entry and exit. Subsequently, the operator extends the outriggers 129 to fix the position of the vehicle body 113.

Then, a crew member (for example, the operator) moves to the second passage body 132 via the stairway device 116. The crew member then uses the floor operation panel to actuate the extending and retracting hydraulic cylinder 133 to project the second passage body 132 to a surface of the fuselage. The crew member then opens the fuselage door of the platform 103 of the airplane 102A. The crew member then actuates the pivoting cylinder 149 to project the front end of the hood body 147 toward the fuselage side as required. Of course, if the weather is fine, the hood body 147 need not be used.

Therefore, an able-bodied person can enter the medium-sized airplane 102A via the stairway section 119 and the floor section 118, the stairway device 116, the first passage body 131, and the right passage (the passage 106 for an able-bodied person) of the second passage body 132.

On the other hand, for the physically handicapped person B using the wheelchair K, the lifting table device 117 is used.

That is, the crew member opens the rear door 194 of the lifting table 183. A crew member (or attendant) C pushes and moves the wheelchair K into the lifting table, and closes the rear door 194 for locking.

Then, the crew member operates the lifting operation panel to lift the lifting table 183 so that the floor surface of the lifting table 183 aligns with the floor surface of the first floor body 134.

Then, the crew member opens the front door 193 of the lifting table 183. The crew member (or attendant) C pushes and moves the wheelchair K toward the first passage body 181 side.

The crew member (or attendant) C then continues to move the wheelchair K from the first passage body 131 to the second passage body 132. The crew member (or attendant) C finally moves the wheelchair K through the right of the second floor body 136 to the platform 103 to enter the airplane.

Of course, to exit the airplane, the procedure opposite to that described above may be carried out.

After the entry or exit is completed, the crew member may operate the floor operation panel to draw in the hood body 147 and the second passage body 132 and then to lower the lifting table 183.

Now, entry to and exit from a small-sized airplane will be described.

Figure 27:
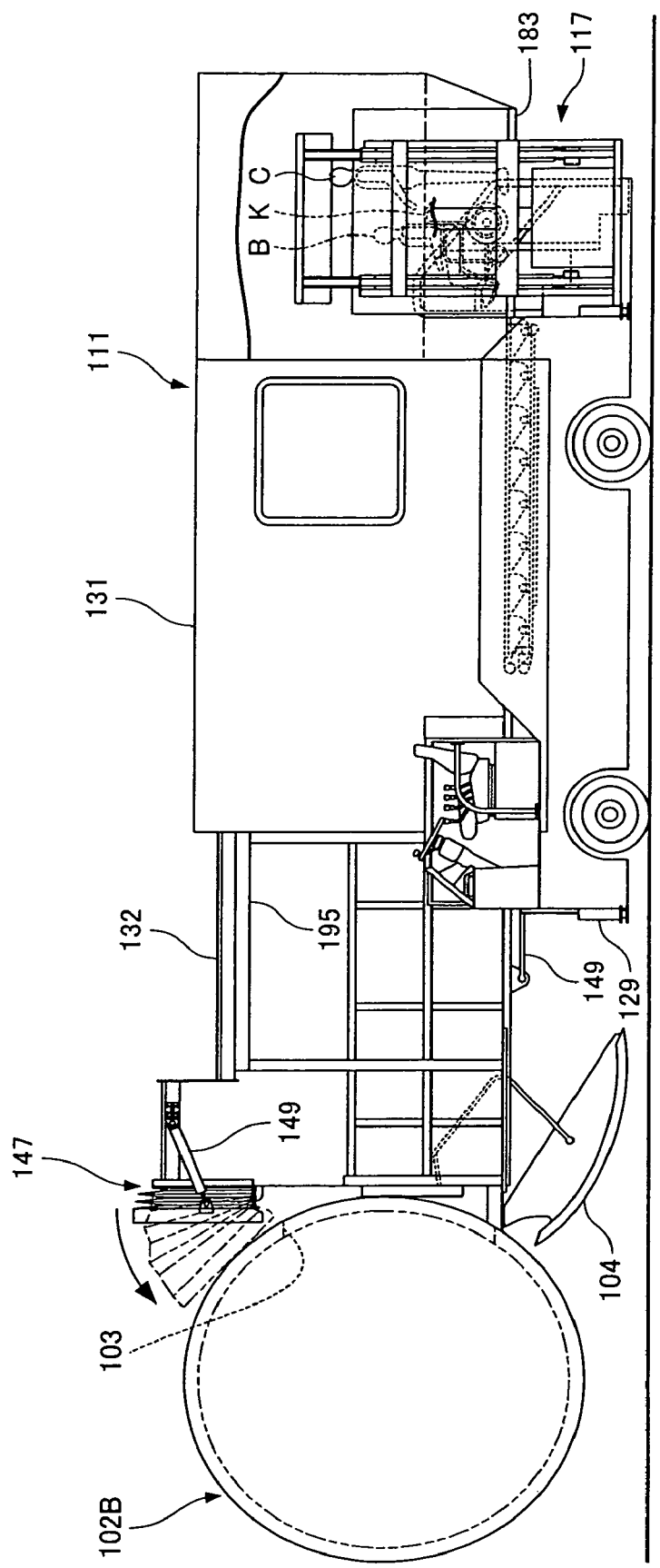
FIG. 27 is a side view showing how a passenger enters a small-sized airplane using the vehicle for passenger entry and exit.

As shown in FIG. 27, a small-sized airplane 102B has the platform 103 at a lower position. Thus, the first passage body 131 is in a lowered condition. In this condition, all the stair treads 174 of the stairway device 116 are at the same level so that passengers can walk on the stair treads 174. Of course, the lifting table 183 is at the lowered position.

Moreover, for the small-sized airplane 102B, a fuselage door 104 having a stairway on the inner surface thereof has been circularly opened so that the stairway is located outside the airplane. Thus, the movable floor bodies 143 are placed upright and are thus in a nonuse condition.

Furthermore, if the weather is not bad, the shutter member 195 of the second passage body 132 is open.

In this condition, the operator allows the vehicle for passenger entry and exit 111 to travel to the vicinity of the small-sized airplane 102B. The operator uses laser light to align the vehicle for passenger entry and exit 111 with the platform 103 and then stops the vehicle for passenger entry and exit 111. The operator then extends the outriggers 129 to fix the position of the vehicle body 113.

Then, the operator drives the extending and retracting hydraulic cylinder 133 to project the second passage body 132 to the fuselage surface. The operator then drives the pivoting hydraulic cylinder 149 to project the front end of the hood body 147 toward the fuselage side. Of course, if the weather is fine, the hood body 147 need not be used.

Then, the operator draws out the bridge plate 146 housed in the housing space section 136d of the cutout 136b of the second floor body 136. The operator places the tip of the bridge plate 146 on the platform 103 of the small-sized airplane 102B to allow movement via the bridge plate 146.

Consequently, an able-bodied person can enter the small-sized airplane 102B via the stairway section 119 and the floor section 118, the horizontally placed stairway device 116, and the first passage body 131 and the right of the second passage body 132.

On the other hand, for the physically handicapped person B using the wheelchair K, the lifting table device 117 is used.

That is, the crew member (for example, the operator) opens the rear door 194 of the lifting table 183. The crew member (or attendant) C pushes and moves the wheelchair K into the lifting table, and closes the rear door 194 for locking.

Then, the crew member operates the lifting operation panel to slightly lift the lifting table 183 so that the floor surface of the lifting table 183 aligns with the floor surface of the first floor body 134 of the first passage body 131.

Then, the crew member opens the front door 193 of the lifting table 183. The crew member (or attendant) C pushes and moves the wheelchair toward the first passage body 181 side.

The crew member (or attendant) C then continues to move the wheelchair K through the first passage body 131 and the left (the passage 107 for a physically handicapped person) of the second passage body 132. The crew member (or attendant) C finally moves the wheelchair K through the right to the platform 103 to enter the airplane.

Of course, to exit the airplane, the procedure opposite to that described above may be carried out.

After the entry or exit is completed, the crew member may operate the floor operation panel to draw in the hood body 147 and the second passage body 132 and then to lower the lifting table 183.

The above description relates to the airplanes of the two types of sizes, that is, the medium- and small-sized airplanes. In other words, the lifting floor device 115 is placed at the lowest position or the highest position. However, by appropriately actuating the expanding hydraulic cylinder 155, the present invention can deal with a case where the platform 103 is placed at any height between the lowest and highest positions.

Thus, the stairway device constituting the passage for an able-bodied person is located at one side of the floor body that can be lifted and lowered by the lifting drive device depending on the size of the fuselage of the airplane (the height of the platform). The passage for a physically handicapped person is provided at the other side of the floor body so as to lie opposite the lifting table of the lifting table device. Thus, the single vehicle for passenger entry and exit allows the able-bodied person and the physically handicapped person to simultaneously enter and exit the airplane regardless of the size of the fuselage.

Of course, Embodiment 2 has components (for example, the television camera) which are described above in Embodiment 1 but not in Embodiment 2 and which are functionally required for the vehicle for passenger entry and exit.

Now, the configuration of Embodiment 2, described above, will be described again in brief.

The vehicle for a passenger comprises the vehicle body that travels controllably by means of the traveling device and the lifting floor device provided in the vehicle body so as to be controllably lifted and lowered via the lifting drive device in order to allow a passenger to enter and exit the airplane.

The lifting floor device is composed of the lifting floor having the passage for an able-bodied person formed at one side in the width direction (lateral direction) and the passage for a physically handicapped person formed at the other side, the moving floor provided so as to be able to be extended from and retracted to the lifting floor, the stairway device located at the position corresponding to the cutout of the lifting floor so as to be pivotable in the vertical plane, the stairway device forming the passage for an able-bodied person, and the lifting table device provided in the vehicle body, behind the passage for a physically handicapped person in the lifting floor.

The lifting drive device is composed of the pantograph-type link support body including the pair of links coupled together like the letter X, and the lifting device that lifts and lowers the link support body.

The stairway device is composed of the lateral pair of side plates each having the front end pivotably attached to the floor body via the horizontal shaft, the plurality of stair treads supported between the opposite side plates so as to be pivotable in the vertical plane, and the link member pivotably coupled to the position of each of the stair treads which is different from the position at which the stair tread is supported, the link member forming the parallel link mechanism together with the side plates and the stair treads.

The components described in Embodiment 1 and corresponding to the first passage body 131, described in Embodiment 2, are the floor body 22, the intermediate section duct body 27, and the rear duct body 38. The components described in Embodiment 1 and corresponding to the second passage body 132, described in Embodiment 2, are the front floor body 28 and the front duct body 32.

In the embodiments, the positions of the passage for an able-bodied person and the passage for a physically handicapped person may be switched with each other in the lateral direction.

Furthermore, in the embodiments, the hydraulic cylinders are used as the drive devices for the lifting drive device and the lifting table device. However, a rack and pinion mechanism or a winch device may be used.

Moreover, in the embodiments, the hydraulic cylinders are used as the drive devices. However, pneumatic cylinders or electric cylinders may be used.

INDUSTRIAL APPLICABILITY

According to the present invention, as described above, whether passengers are able-bodied persons or physically handicapped persons and regardless of the size of the airplane, the single vehicle for passenger entry and exit can be used to allow the passengers to safely and quickly enter and exit the airplane. The present invention is thus very useful at an airport facility such as a passenger terminal.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

We claim:

1. A vehicle for passenger entry and exit comprising:
   a vehicle body, the vehicle body having a floor section formed at a rear of the vehicle body, at one side of said vehicle body;
   a lifting floor device placed above the vehicle body and having a floor body and a lifting drive device for lifting and lowering said floor body, the floor body having a cutout at one side of the floor body, at a rear half thereof, and the other side of the floor body being used as a passage for a physically handicapped person;
   a stairway device as a passage for an able-bodied person being provided between the floor body and the floor section on a floor body side in the cutout, the stairway device being pivotable in a vertical plane; and
   a lifting table device having a lifting table placed behind the vehicle body on the other side of said vehicle body, wherein said lifting table, when lifted, faces a rear end of the passage for a physically handicapped person.

2. The vehicle for passenger entry and exit according to claim 1, further comprising a stairway section behind the floor section of the vehicle body.

3. The vehicle for passenger entry and exit according to claim 1, wherein the stairway device has a stairway body having a plurality of stair treads, a movable member that can be placed upright and over sideways is provided on a side of the stairway body, and wherein the movable member, when the floor body is lowered to place the stairway body horizontally, causes the movable member to take a lying sideways posture, forming a passage for an able-bodied person on a top surface of the movable member and, when the floor body is lifted to place the stair treads horizontally to tilt the stairway body, causes the movable member to take an upright posture, the movable member forms a side cover.

4. The vehicle for passenger entry and exit according to claim 1, wherein the stairway device comprises a lateral pair of side plates each having a front end pivotably attached to the floor body via a horizontal shaft, a plurality of stair treads supported between the opposite side plates being pivotable in a vertical plane, and a link member pivotably coupled to a position of each of the stair treads which is different from that at which the stair tread is supported, wherein the link member forms a parallel link mechanism together with the side plates and the stair treads.

5. The vehicle for passenger entry and exit according to claim 1, wherein the lifting table device comprises a lifting table provided at a rear end of the vehicle body for being lifted and lowered, and a lifting drive section for lifting and lowering the lifting table, and a side wall member being provided at a side of the lifting table, and openable and closable doors being provided at a front and a rear, respectively, of the lifting table.

6. The vehicle for passenger entry and exit according to claim 1, wherein the floor body comprises a lifting floor supported on a lifting drive device side, a moving floor provided at a front of the lifting floor controllably extended from and retracted to a front end of the lifting floor, and an extending and retracting device for extending and retracting the moving floor from and to the lifting floor.

* * * * *